United States Patent
Lee et al.

(10) Patent No.: US 11,544,549 B2
(45) Date of Patent: Jan. 3, 2023

(54) METHOD AND APPARATUS WITH NEURAL NETWORK

(71) Applicant: SAMSUNG ELECTRONICS CO., LTD., Suwon-si (KR)

(72) Inventors: Junhaeng Lee, Hwaseong-si (KR); Hyunsun Park, Seoul (KR); Yeongjae Choi, Changwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1166 days.

(21) Appl. No.: 16/106,703

(22) Filed: Aug. 21, 2018

(65) Prior Publication Data

US 2019/0122106 A1    Apr. 25, 2019

(51) Int. Cl.
*G06N 3/08* (2006.01)
*G06N 3/063* (2006.01)
*G06F 7/483* (2006.01)

(52) U.S. Cl.
CPC ........... *G06N 3/08* (2013.01); *G06F 7/483* (2013.01); *G06N 3/063* (2013.01)

(58) Field of Classification Search
CPC . G06N 3/08; G06N 3/063; G06N 3/04; G06F 7/483
See application file for complete search history.

(56) References Cited

U.S. PATENT DOCUMENTS

| | | | |
|---|---|---|---|
| 2015/0324690 A1* | 11/2015 | Chilimbi | G06N 3/063 706/27 |
| 2016/0012330 A1 | 1/2016 | Pescianschi | |
| 2017/0061279 A1* | 3/2017 | Yang | G06N 3/084 |
| 2017/0286830 A1 | 10/2017 | El-Yaniv et al. | |
| 2019/0042948 A1 | 2/2019 | Lee et al. | |

FOREIGN PATENT DOCUMENTS

CN    106650931 A    5/2017

OTHER PUBLICATIONS

Ricks, B., & Ventura, D. (2003). Training a quantum neural network. Advances in neural information processing systems, 16. (Year: 2003).*
Yin, L., Astola, J., & Neuvo, Y. (1993). A new class of nonlinear filters-neural filters. IEEE Transactions on Signal Processing, 41(3), 1201-1222. (Year: 1993).*
Shafiee, A., Nag, A., Muralimanohar, N., Balasubramonian, R., Strachan, J. P., Hu, M., . . . & Srikumar, V. (2016). ISAAC: A convolutional neural network accelerator with in-situ analog arithmetic in crossbars. ACM SIGARCH Computer Architecture News, 44(3), 14-26. (Year: 2016).*

(Continued)

*Primary Examiner* — Brian M Smith
*Assistant Examiner* — Henry Trong Nguyen
(74) *Attorney, Agent, or Firm* — NSIP Law

(57) ABSTRACT

A processor-implemented neural network method includes calculating individual update values for a weight assigned to a connection relationship between nodes included in a neural network; generating an accumulated update value by accumulating the individual update values in an accumulation buffer; and training the neural network by updating the weight using the accumulated update value in response to the accumulated update value being equal to or greater than a threshold value.

30 Claims, 14 Drawing Sheets

(56) References Cited

OTHER PUBLICATIONS

Li, Z., Chen, P. Y., Xu, H., & Yu, S. (2017). Design of ternary neural network with 3-D vertical RRAM array. IEEE Transactions on Electron Devices, 64(6), 2721-2727. (Year: 2017).*

Stromatias, E., Neil, D., Pfeiffer, M., Galluppi, F., Furber, S. B., & Liu, S. C. (2015). Robustness of spiking deep belief networks to noise and reduced bit precision of neuro-inspired hardware platforms. Frontiers in neuroscience, 9, 222. (Year: 2015).*

Boni, A., & Zorat, A. (Jul. 2006). FPGA implementation of support vector machines with pseudo-logarithmic number representation. In The 2006 IEEE International Joint Conference on Neural Network Proceedings (pp. 618-624). IEEE. (Year: 2006).*

Chang, S. G., Yu, B., & Vetterli, M. (2000). Adaptive wavelet thresholding for image denoising and compression. IEEE transactions on image processing, 9(9), 1532-1546. (Year: 2000).*

Gysel, P. M. (2016). Ristretto: Hardware-oriented approximation of convolutional neural networks. University of California, Davis. (Year: 2016).*

Courbariaux, M., Bengio, Y., & David, J. P. (2014). Training deep neural networks with low precision multiplications. arXiv preprint arXiv:1412.7024. (Year: 2014).*

Simard, P., & Graf, H. (1993). Backpropagation without multiplication. Advances in Neural Information Processing Systems, 6. (Year: 1993).*

Seide, F., Fu, H., Droppo, J., Li, G., & Yu, D. (2014). 1-bit stochastic gradient descent and its application to data-parallel distributed training of speech dnns. In Fifteenth annual conference of the international speech communication association. (Year: 2014).*

Courbariaux, Matthieu, et al. "Training Deep Neural Networks With Low Precision Multiplications" *arXiv preprint arXiv:1412.7024*, Sep. 23, 2015 (10 pages in English).

Zhou, Shuchang., et al. "DoReFa-Net: Training Low Bitwidth Convolutional Neural Networks With Low Bitwidth Gradients." *arXiv preprint arXiv:1606.06160*, Jul. 17, 2016 (14 pages in English).

Kahan, "Further Remarks on Reducing Truncation Errors", *Communications of the ACM*, vol. 8 Issue 1, Jan. 1, 1965, p. 40 (2 pages in English).

Micikevicius et al., "Mixed Precision Training", *CORR (ARXIV)*, vol. 1710.03740, Oct. 12, 2017, pp. 1-14 (14 pages in English).

Rathi et al., "STDP Based Pruning of Connections and Weight Quantization in Spiking Neural Networks for Energy-Efficient Recognition", *CORR (ARXIV)*, Oct. 12, 2017, pp. 1-9 (9 pages in English).

Extended European Search Report dated Mar. 18, 2019 in corresponding European Patent Application No. 18199332.0 (13 pages in English).

* cited by examiner

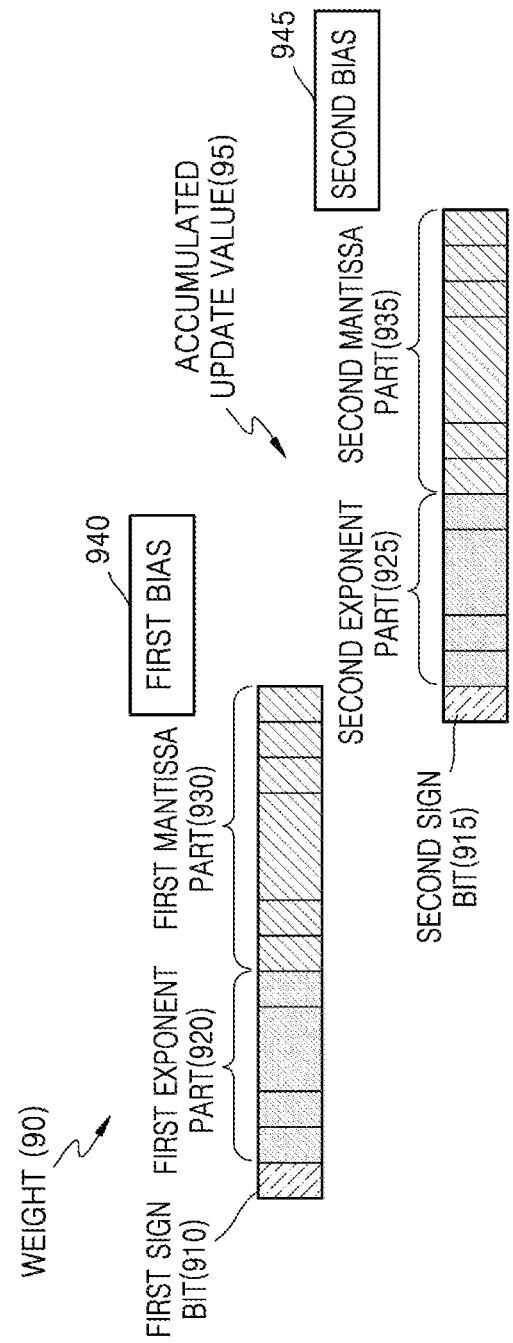

METHOD AND APPARATUS WITH NEURAL NETWORK

CROSS-REFERENCE TO RELATED APPLICATIONS

The This application claims the benefit of Korean Patent Application No. 10-2017-0137374, filed on Oct. 23, 2017, in the Korean Intellectual Property Office, the disclosure of which is incorporated herein in its entirety by reference.

BACKGROUND

1. Field

The present disclosure relates to methods and apparatuses with a neural network.

2. Description of Related Art

Technological automation of feature extraction, pattern recognition, and/or analyses, as only examples, has been implemented through processor implemented neural network models, as specialized computational architectures, that after substantial training may provide computationally intuitive feature extractions or recognitions, mappings between input patterns and output patterns, pattern recognitions of input patterns, or categorization in various forms. The trained capability of extracting such information or recognitions, generating such mappings, performing such pattern recognitions, or performing such categorizations may be referred to as a learning capability of the neural network. Such trained capabilities may also enable the specialized computational architecture to classify an input pattern or object(s), or portions of the input pattern or object(s), e.g., as a member that belongs to one or more predetermined groups. Further, because of the specialized training, such specially trained neural network may thereby have a generalization capability of generating a relatively accurate or reliable output with respect to an input pattern that the neural network may not have been trained for, for example. However, because such operations are performed through such specialized computation architectures, and in different automated manners than they would have been performed in non-computer implemented or non-automated approaches, they also invite problems or drawbacks that only occur because of the automated and specialized computational architecture manner that they are implement.

The neural network apparatus performs many operations on complex input data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented neural network method, the method including: calculating individual update values for a weight assigned to a connection relationship between nodes included in a neural network; generating an accumulated update value by accumulating the individual update values in an accumulation buffer; and training the neural network by updating the weight using the accumulated update value in response to the accumulated update value being equal to or greater than a threshold value.

The threshold value may be a value corresponding to a least significant effective bit of the weight; and the updating may include: determining an effective update value based on the accumulated update value, adding the effective update value to the weight, and subtracting the effective update value from the accumulated update value of the accumulation buffer.

The effective update value may be a portion of the accumulated update value.

The effective update value may be a multiple of the least significant effective bit of the weight.

The method may further include determining whether the accumulated update value may be equal to or greater than the threshold value at a predetermined update period.

The method may further include accumulating the individual update values in the accumulation buffer until a next update period in response to the accumulated update value being smaller than the threshold value.

The weight may be a fixed point value including a first sign bit, a first integer part, and a first fractional part; the accumulated update value may be a fixed point value including a second sign bit and a second fractional part; and the updating may include adding, to the weight, a value of at least one bit that overlaps the first fractional part of the weight among bits representing the second fractional part of the accumulated update value.

The updating may include initializing the value of the at least one bit that overlaps the first fractional part to a same value as the second sign bit.

The method may further include adjusting a position of a decimal point of the accumulated update value.

The adjusting may include: moving the position of the decimal point of the accumulated update value in a lower bit direction of the accumulated update value in response to an average value of the individual update values being smaller than a second threshold value; and moving the position of the decimal point of the accumulated update value in an upper bit direction of the accumulated update value in response to the average value of the individual update values being greater than the second threshold value.

The second threshold value may be 1/a times the threshold value; and a may be a natural number.

The weight may be a dynamic fixed point value of which a bit number of the first fractional part may be adjusted.

The weight may be a floating point value including a first sign bit, a first exponent part, a first mantissa part, and a first bias; the accumulated update value may be a floating point value including a second sign bit, a second exponent part, a second mantissa part, and a second bias; and the updating may include adding an effective value of the accumulated update value included in an effective number range of the weight to the weight.

The method may further include adjusting the second bias of the accumulated update value.

The adjusting may include: increasing the second bias in response to the second exponent of the accumulated update value being greater than the threshold value; and decreasing the second bias in response to the accumulated update value being smaller than a second threshold value.

The second threshold value may be 1/b times the threshold value; and b may be a natural number.

A non-transitory computer-readable storage medium may store instructions that, when executed by a processor, cause the processor to perform the method.

In another general aspect, there is provided a neural network apparatus, the apparatus including: one or more processors configured to: calculate individual update values for a weight assigned to a connection relationship between nodes included in a neural network, generate an accumulated update value by accumulating the individual update values in an accumulation buffer, and train the neural network by updating the weight using the accumulated update value in response to the accumulated update value being equal to or greater than a threshold value.

The threshold value may be a value corresponding to a least significant effective bit of the weight; and the one or more processors are further configured to: determine an effective update value based on the accumulated update value, add the effective update value to the weight, and subtract the effective update value from the accumulated update value of the accumulation buffer.

The effective update value may be a portion of the accumulated update value.

The effective update value may be a multiple of the least significant effective bit of the weight.

The one or more processors are further configured to determine whether the accumulated update value may be equal to or greater than the threshold value at a predetermined update period.

The one or more processors are further configured to accumulate the individual update values in the accumulation buffer until a next update period in response to the accumulated update value being smaller than the threshold value.

The weight may be a fixed point value including a first sign bit, a first integer part, and a first fractional part; the accumulated update value may be a fixed point value including a second sign bit and a second fractional part; the one or more processors are further configured to add, to the weight, a value of at least one bit that overlaps the first fractional part of the weight among bits representing the second fractional part of the accumulated update value.

The one or more processors are further configured to initialize the value of the at least one bit that overlaps the first fractional part to a same value as the second sign bit.

The one or more processors are further configured to adjust a position of a decimal point of the accumulated update value.

The one or more processors are further configured to: move the position of the decimal point of the accumulated update value in a lower bit direction of the accumulated update value in response to an average value of the individual update values being smaller than a second threshold value; and move the position of the decimal point of the accumulated update value in an upper bit direction of the accumulated update value in response to the average value of the individual update values being greater than the second threshold value.

The second threshold value may be 1/a times the threshold value; and a may be a natural number.

The weight may be a floating point value including a first sign bit, a first exponent part, a first mantissa part, and a first bias; the accumulated update value may be a floating point value including a second sign bit, a second exponent part, a second mantissa part, and a second bias; and the one or more processors are further configured to add an effective value of the accumulated update value included in an effective number range of the weight to the weight.

The apparatus may further include a memory configured to store one or more programs, wherein the one or more processors are configured to calculate the individual update values, generate the accumulated update value, and train the neural network, in response to executing the one or more programs.

In another general aspect, there is provided a processor-implemented neural network method, the method including: calculating individual update values for a weight assigned to a connection relationship between nodes included in a neural network; generating an accumulated update value by adding the individual update values; and training the neural network by updating the weight using the accumulated update value in response to the accumulated update value being equal to or greater than a threshold value.

The updating may include: determining a portion of the accumulated update value to be an effective update value; and updating the weight by adding the effective update value to the weight.

The method may further include subtracting the effective update value from the accumulated update value; adding another individual update value to the accumulated update value; and re-updating the weight using the accumulated update value in response to the accumulated update value being equal to or greater than the threshold value.

The method may further include adjusting a size of the accumulated update value, by a factor, based on a comparison between a second threshold value and either one or both of an average value of the individual update values and the accumulated update value, wherein the updating may include updating the weight using the adjusted accumulated update value.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which:

FIG. 9 is a diagram illustrating an example of a neural network that uses floating point parameters according to one or more embodiments;

DETAILED DESCRIPTION

Figure 1:
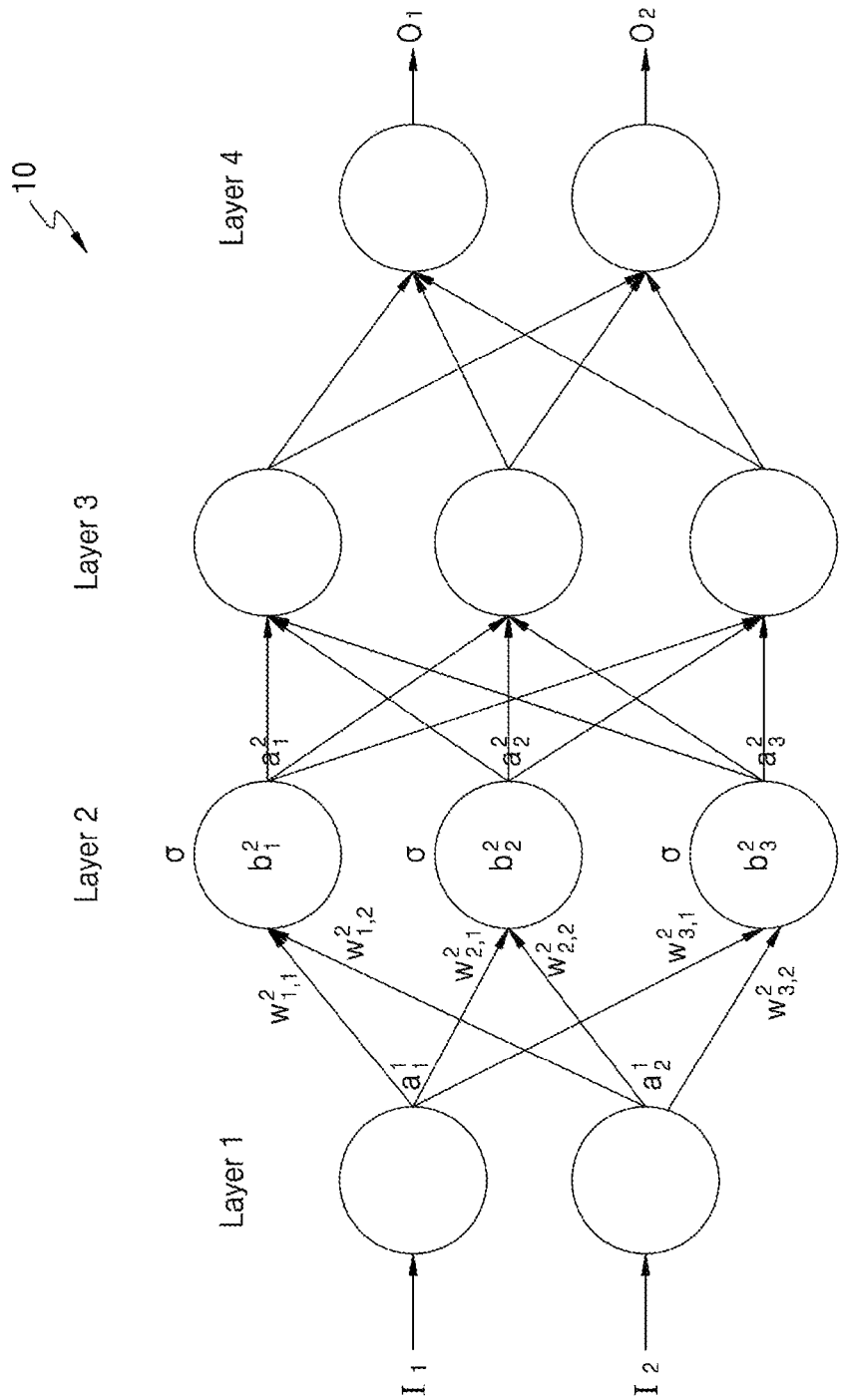
FIG. 1 is a diagram illustrating an example of a neural network according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

As used herein, the terms 'comprises' or 'comprising' and the like should not be construed as necessarily including all of various elements or operations described in the specification and should be as excluding some of them, or may be interpreted as including additional components or operations.

Also, as used herein, the terms including ordinals such as "first" or "second" may be used to describe various elements, but the elements should not be limited by the terms. The terms are used only for the purpose of distinguishing one element from another.

The embodiments are directed to a method and an apparatus for processing a parameter in a neural network, and detailed descriptions thereof will be omitted with respect to matters widely known.

FIG. 1 is a diagram illustrating an example of a neural network 10 according to one or more embodiments.

Thus, as illustrated in FIG. 1, the neural network 10 may have a structure including an input layer, hidden layers, and an output layer. The neural network 10 may perform an operation based on received input data (for example, $I_1$ and $I_2$) and generate output data (for example, $O_1$ and $O_2$) based on a result of the operation.

The neural network 10 may be a deep neural network (DNN) or an n-layers neural network including two or more hidden layers. For example, as illustrated in FIG. 1, the neural network 10 may be the DNN including an input layer (Layer 1), two hidden layers (Layer 2 and Layer 3), and an output layer (Layer 4). The DNN may be a fully connected neural network, convolutional neural network (CNN), a recurrent neural network (RNN), a deep belief network, a restricted Boltzman machine. The DNN may also include different or overlapping neural network portions respectively with such full, convolutional, recurrent connections. However, the DNN is not limited thereto.

The neural network 10 may be configured to perform, as non-limiting examples, object classification, object recognition, voice recognition, and image recognition by mutually mapping input data and output data in a nonlinear relationship based on deep learning. Such deep learning is indicative of processor implemented machine learning schemes for solving issues, such as issues related to automated image or speech recognition from a big data set, as non-limiting examples. The deep learning may be implemented by mapping of input data and the output data through supervised or unsupervised learning or training, such that when trained the resultant machine learning model, engine, or example NN may intuitively map further input data to output data with a desired accuracy or reliability. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

When the neural network 10 includes a DNN structure, the neural network 10 may include more layers that may extract effective information, such as for pattern recognition or for classification purposes. In FIG. 1, the neural network 10 is illustrated as including four layers, but this is only an example, and the neural network 10 may include less or more layers. For example, the neural network may include one or more input layers, three or more hidden layers, and one or more one output layers, for a total of five or more layers. In addition, the neural network 10 may include layers of various structures different from those illustrated in FIG. 1.

Each of the layers included in the neural network 10 may include a plurality of nodes referred to as 'processing elements (PEs)', 'units', or similar terms. The nodes may also be referred to as artificial neurons though such reference is not intended to impart any relatedness with respect to how the neural network architecture computationally maps or thereby intuitively recognizes information and how a human's neurons operate, i.e., the term artificial neuron is merely a term of art referring to the hardware implemented nodes of a neural network. For example, as illustrated in FIG. 1, the input layer (Layer 1) may include two nodes and the second layer (Layer 2) may include three nodes. However, this is only an example and each of the layers included in the neural network 10 may include various numbers of nodes.

The nodes included in different layers included in the neural network 10 may be connected or linked to one another to exchange data. For example, one node in a layer may receive data from other nodes in another layer and operate according to the received data, and output operation results to other nodes in yet another layer. Additionally, in a recurrent connection example, one node in a layer may receive data from itself, and/or from another node of the layer, from a previous time. The number of the connections may correspond to the number of the nodes included in the subsequent layer. For example, in adjacent fully connected layers, each node of a current layer may have a respective connection to each node of the subsequent layer, noting that in some examples such full connections may later be pruned or minimized during training or optimization.

An output value of each of the nodes may be referred to as activation, or a value which results from such a predetermined activation function of the corresponding node. The activation may thus be the output value of one node, and at the same time and due to corresponding connection(s) with a next layer, may be an input value for nodes included in the next layer. Each of the nodes may determine its activation based on resultant activations and weights received from the nodes included in a previous layer. A weight is a parameter used for calculating the activation at each node and may be a value assigned to a connection relationship between nodes. For example, an output from a previous layer's node may be provided to as an input to a node of a next or subsequent layer through a weighted connection between the previous layer's node and the node of the next layer, with the weight of the weighted connection being variously adjusted during the training of the neural network until the neural network is trained for a desired objective. There may be additional connections to the node of the next layer, such as for providing a bias connection value through a connection that may or may not be weighted and/or for providing the above example recurrent connection which may be weighted. During training and implementation such connections and connection weights may be selectively implemented, removed, and varied to generate or obtain a resultant neural network that is thereby trained and that may be correspondingly implemented for the trained objective, such as for any of the above example recognition objectives.

The architecture, selective connections between neighboring nodes, and corresponding connection weights may be varied during training of the neural network. The connection weights of the neuro network may also be referred to as parameters of the neural network. For example, in a non-limiting supervised training example, the neural network may be trained based on labeled input image information or desired corresponding output images classifications and through backpropagation, as only an example. In the training, connection weightings between nodes of different hidden layers may be recursively adjusted until the corresponding neural network model is trained with a desired accuracy rate or below a maximum error rate, for example. The respectively trained neuro network may be stored in a memory of the training or recognition apparatus. For example, the trained neural network may be stored in trained vectors, matrix or matrices, or other format, where elements of the matrix represent or suggest the corresponding trained weighted connections (parameters) of the corresponding neural network structure. The stored trained neural network may further include hyper-parameter information, which may define the specific structure or architecture of the corresponding neural network for which the example stored trained parameters correspond to. The hyper-parameters may define how many hidden layers, the function of the layers, such as whether they are convolutional layers, as only example, such as how many and respective structures there are of such convolutional, de-convolutional, sampling, recurrent, and/or fully connected hidden layers of the neural network structure. The hyper-parameters may further include information of the configuration and values of any bias and/or contextual nodes in the neural network in differing examples, corresponding activation functions of the nodes, types of nodes, such as long short-term memory nodes in some examples, and define any or any further recurrent structures of the neural network, which may vary in differing embodiments. In the above example when there are multiple input layers, the hyper-parameters may for example also describe the architecture of the neural network for where within the neural network information acted on by a portion of the neural network subsequent to a first input layer is merged or considered with neural network information acted on by another portion of the neural network subsequent to a second input layer, or further where such portion and other portion of the neural network are divergent portions after a single input layer whose respective information is similarly subsequently merged. Similarly, in examples with separate output layers, the hyper-parameters may for example also describe the architecture of the neural network for where within the neural network neural network information acted on by an earlier portion of the neural network diverges or is separately considered within the neural network by separate, e.g., independent or dependent, portions of the neural network for ultimate respective consideration and provision to the separate output layers or separate pre-output layers that are then collectively acted on by a single output layer. Here, the example neural network information within the neural network may be information resident at, or represented by, respective layers of the neural network, and/or respective information resident at, or represented by, respective connections within the neural network. In some examples, such as where a hidden layer is a convolutional layer, the layer may output or generate one or more extracted feature information of information provided to the convolutional layer and dependent on the respectively applied kernels of the convolutional layer. In this example, the input of the convolutional layer may be two, three, or more dimensional information, such as a three dimensional volume and the output of the convolutional layer may also be multi-dimensional information dependent on the set convolutional parameters, kernels, and architecture of the convolutional layer. The input to the neural network 10, as well as the example input data of the input layer, may similarly be singular or multi-dimensional information, such as in the form of pixels, time captured data, volume data, feature information, feature vectors, or feature maps, as non-limiting examples. Thus, the input data may be representative of image information, audio information, or other information. In an example where the neural network 100 is implemented with battery state monitoring for example, the input information may alternatively be various battery state information, e.g., voltage, current, temperature, etc., such as at different points in time or over periods of time.

Accordingly, returning to FIG. 1, each of the nodes may be a computational unit that receives one or more data values, e.g., through such weighted connections, and outputs the resulting activation and thereby may map inputs to outputs. The computational unit may correspond to the activation function for a node. As a non-limiting example, if σ is an activation function, $w_{jk}^i$ is a weight for the connection between the $k^{th}$ node in the $(i-1)^{th}$ layer and the $j^{th}$ node in the $i^{th}$ layer, $b_j^i$ is a bias connection value for the $j^{th}$ layer, and $a_j^i$ is the resultant activation of the $j^{th}$ node in the $i^{th}$ layer, the activation $a_j^i$ may be expressed by the below Equation 1.

$$a_j^i = \sigma(\Sigma_k(w_{jk}^i \times a_k^{i-1}) + b_j^i). \quad \text{[Equation 1]}$$

As illustrated in FIG. 1, the activation of the first node in the second layer (Layer 2) may be expressed as $a_1^2$. In addition, $a_1^2$ may have a value of $\sigma(w_{1,1}^2 \times a_1^1 + w_{1,2}^2 \times a_2^1 + b_1^2)$ according to Equation 1. However, the above-described Equation 1 is only an example for describing the activation and the weight used for processing data in the neural network 10, but is not limited thereto. The activation may be a value obtained by processing through a rectified linear unit (ReLU) a value obtained by applying the activation function to a weighted sum of activations received from the previous layer.

The neural network 10 may use a low-precision number system. The low-precision number system is a system that reduces a computational amount while reducing precision loss by using data having a relatively smaller number of bits for parameters and/or activation results than that of a typical high-precision neural network. For example, a typical high-precision neural network uses 32-bit or 64-bit floating point or fixed point data for parameters and activation results, while the neural network 10 may uses a low-precision number system that may be 8-bit or 16-bit floating point or fixed point data for the parameters and/or the activation results.

As noted, use of the neural network 10 using 8-bit or 16-bit floating point or fixed point data means that the activation values, the weights, and the bias connection values of each of plural nodes, e.g., of one or more layers, of the neural network 10 have an 8-bit or 16-bit floating point or fixed point data format. However, the neural network 10 that uses the low-precise number system may use floating point or fixed point data with a smaller number of bits as parameters and is not limited to the above example.

In the neural network 10, a large number of data sets are exchanged between a plurality of mutually connected nodes and undergo many computation processes through layers. The neural network 10 that uses the low-precise number system uses data having a smaller number of bits than that of the typical high-precision neural network during many computation processes, and thus a computational amount of the neural network 10 may be reduced as compared with the typical high-precision neural network. Also, because the neural network 10 uses a smaller number of bits than that of the typical higher-precision neural network, the neural network 10 may handle more complex data sets than the typical higher-precision neural network. with the same resources. However, even if the neural network 10 that uses the low-precise number system reduces the computational amount, a technique for minimizing precision loss may be desirable. Methods of minimizing the precision loss in the neural network 10 that use such a low-precise number system will now be described in greater detail with reference to FIGS. 2 to 12.

Figure 2:
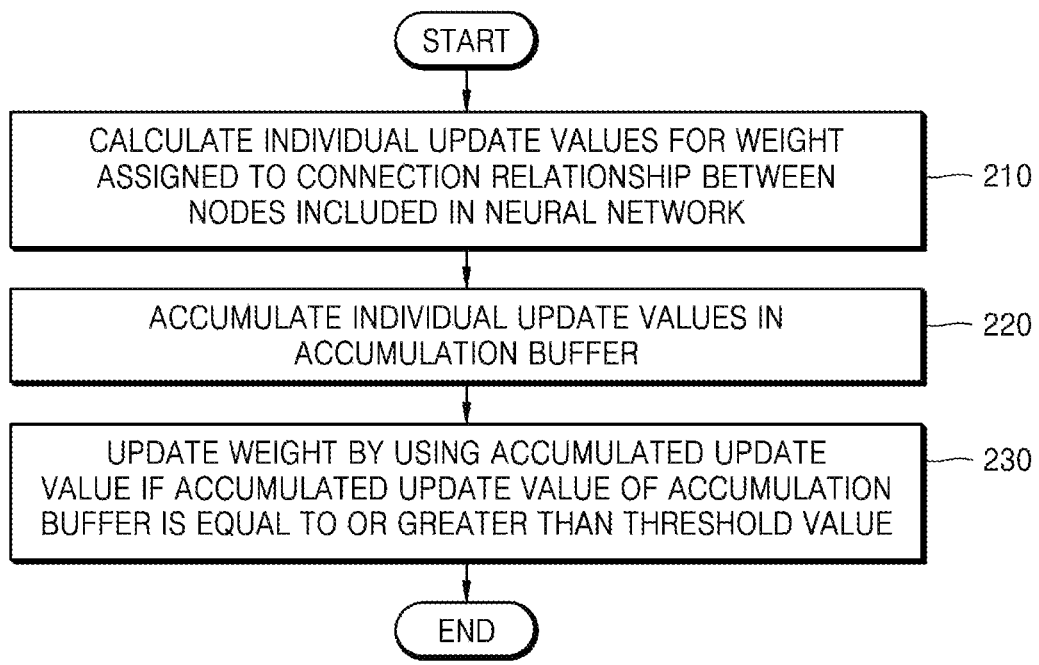
FIG. 2 is a flowchart illustrating an example of a method of processing parameters in a neural network according to one or more embodiments.

FIG. 2 is a flowchart illustrating an example of a method of processing parameters in a neural network according to some embodiments. The neural network may be a neural network that uses a low-precision number system. The parameters may be weights assigned to connection relationships between nodes included in the neural network. Hereinafter, the parameters to be processed in the neural network will be described as weights, but the parameters are not necessarily limited to the weights. The parameters may refer to any data processed in the neural network.

Referring to FIG. 2, in operation 210, the neural network apparatus may calculate individual update values for the weights assigned to the connection relationships between the nodes included in the neural network. A weight may be a floating point value or a fixed point value. The floating point value and the fixed point value will be described below with reference to FIGS. 3A to 3C.

Figure 3A:
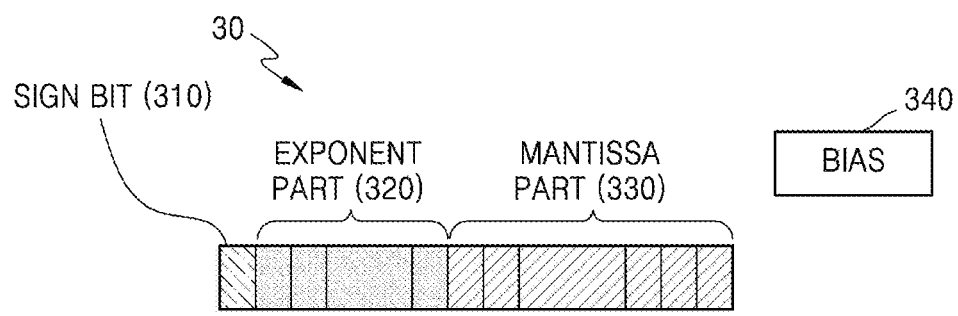
FIG. 3A is a diagram illustrating an example of a floating point value according to one or more embodiments.
Figure 3B:
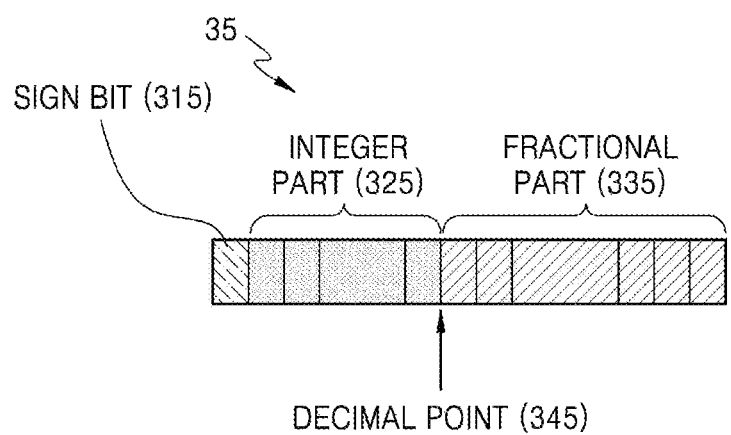
FIG. 3B is an example of a fixed point value according to one or more embodiments.
Figure 3C:
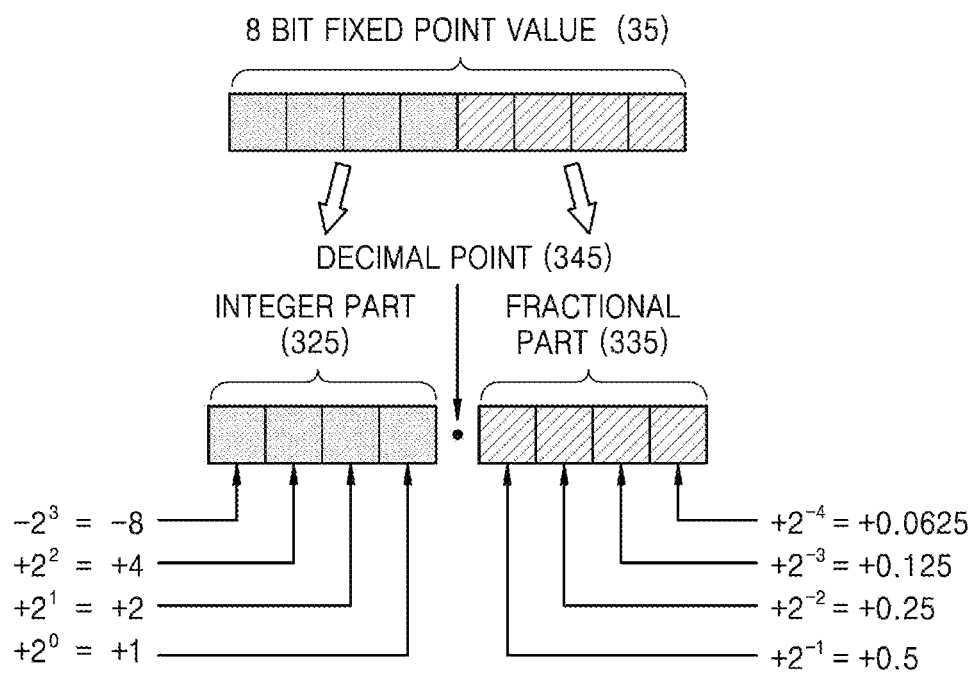
FIG. 3C is a diagram illustrating another example of a fixed point value according to one or more embodiments.

FIG. 3A is a diagram illustrating an example of a floating point value 30 according to some embodiments. FIG. 3B is an example of a fixed point value 35 according to some embodiments. FIG. 3C is a diagram illustrating another example of a fixed point value according to some embodiments.

Referring to FIG. 3A, the floating point value 30 may include a sign bit 310, an exponent part 320, a mantissa part 330, and a bias 340. A floating point means that a number is divided into a part indicating a decimal point part (that is, mantissa) and a part indicating a decimal point position (that is, exponent).

The mantissa part 330 may correspond to the part indicating the decimal point part. The exponent part 320 may correspond to the part indicating the decimal point position. The sign bit 310 may determine a sign of the floating point value 30. The bias 340 may be a value that is added to or subtracted from the exponent part 320 and that is determined to represent a negative exponent. The floating point value 30 may include the sign bit 310, bits corresponding to the exponent part 320, and bits corresponding to the mantissa part 330. The bias 340 may be previously determined with respect to the floating point value 30 and stored separately in either one or both of a memory and a local memory, such as an accumulation buffer.

Meanwhile, when the sign bit 310 denotes sign, the exponent part 320 denotes exponent, the mantissa part 330 denotes mantissa, and the bias 340 denotes bias, the floating point value 30 may be a value following Equation 2.

$$\text{Floating point value} = (-1)^{sign} \cdot 2^{exponent-bias} \cdot \text{mantissa} \quad \text{[Equation 2]}$$

Referring to FIG. 3B, the fixed point value 35 may include a sign bit 315, an integer part 325, a fractional part 335, and a decimal point 345. A fixed point means a notation representing decimal of a fixed digit number using a decimal point.

The sign bit 315 may determine a sign of the fixed point value 35. The integer part 325 may correspond to a part representing an integer of the fixed point value 35. The fractional part 335 may correspond to a part representing the decimal of the fixed point value 35. The decimal point 345 may mean a point that is a reference for distinguishing the integer part 325 and the fractional part 335 of the fixed point value 35.

Meanwhile, a value represented by the fixed point value 35 may be described with reference to FIG. 3C. Referring to FIG. 3C, the fixed point value 35 may be an 8-bit fixed point value. The fixed point value 35 may also include the integer part 325, the fractional part 335, and the decimal point 345.

Each of the bits representing the integer part 325 and the fractional part 335 may have a value of 1 or 0. Also, as shown in FIG. 3C, the bits representing the integer part 325 and the fractional part 335 may sequentially have values of −8, +4, +2, +1, +0.5, +0.25, +0.125 and +0.0625. When a most significant bit of the integer part 325 is 1, since a value represented by the most significant bit of the integer part 325 is −8, even if other bits included in the integer part 325 and the fractional part 335 have a certain value, the value represented by the fixed point value 35 may be negative. The most significant bit of the integer part 325 may correspond to the sign bit 315 that determines the sign of the fixed point value 35.

However, FIG. 3C is only an example, and the fixed point value 35 may be a 16-bit fixed point value and may be a fixed point value having any suitable number of bits. Further, the fixed point value 35 may represent a negative number by any one of a coding expression method, a complement method of 1, and a complement method of 2.

Returning back to FIG. 2, an individual update value may be a value that is calculated to update a weight, such as during the training of the neural network 10 of FIG. 1. A target to learn in the neural network is the weight. As noted above, the weight is updated repeatedly in a learning process in order for the neural network to gradually become trained to output accurate results that at least meet a learned accuracy threshold or do no exceed a maximum error threshold. As one of methods of updating the weight, for example, a gradient descent algorithm may be used. The gradient descent algorithm may mean an algorithm that minimizes an error by adjusting a parameter in a gradient direction of a loss function or an error function to find a lowest point of the loss function or the error function. For example, when the loss function denotes L, the parameter is θ, and a learning rate is η, the parameter may be adjusted according to Equation 3 below.

$$\theta \leftarrow \theta - \eta \frac{\partial L}{\partial \theta} \qquad \text{[Equation 3]}$$

$$\eta \frac{\partial L}{\partial \theta}$$

calculated to update the parameter may mean a gradient for adjusting the parameter in the gradient direction of the loss function. For example, when the parameter is the weight, $$\eta \frac{\partial L}{\partial \theta}$$

may be the individual update value calculated to update the weight. Also, the learning rate 7 may be a varied determiner that controls how fast or aggressive such changes are made to the parameter is θ.

Generally, the individual update value $$\eta \frac{\partial L}{\partial \theta}$$

has a much smaller value than the weight. Thus, compared to the aforementioned typical high-precision neural network approaches, if a neural network uses a low-precision number system (e.g., 8 bits or 16 bits), the individual update value $$\eta \frac{\partial L}{\partial \theta}$$

may not be included in a range of values that the weight may represent. Thus, when the weight could be updated according to Equation 3, the individual update value $$\eta \frac{\partial L}{\partial \theta}$$

could be disregarded and the weight may not be updated. Although the weight needs to be updated repetitively, in order for the neural network to gradually output better results, the weight may not be updated due to a magnitude of the individual update value $$\eta \frac{\partial L}{\partial \theta},$$

and thus, it may be difficult or impractical to train such a low-precision neural network.

Rather, a neural network apparatus according to the present disclosure may perform operations 220, 230, and 240 such that the individual update values are not disregarded but reflected in a process of updating of the weight, so a low-precision neural network may be trained without such impediments and drawbacks. In operation 220, the neural network apparatus may accumulate the individual update values in an accumulation buffer. The accumulation buffer may be dedicated hardware for accumulating the individual update values and may be memory allocated to accumulate the individual update values. The individual update values may be accumulated in the accumulation buffer and become an accumulated update value. The accumulation buffer may store the accumulated update value.

In the neural network that uses the low-precision number system, such as the neural network 10 of FIG. 1 as non-limiting examples, the neural network apparatus may accumulate the individual update values to a magnitude that may affect the weight such that the individual update values are not disregarded in the process of updating of the weight during training of the neural network.

In operation 230, the neural network apparatus may update the weight by using the accumulated update value if the accumulated update value of the accumulation buffer is equal to or greater than a threshold value. The neural network apparatus may determine whether the accumulated update value of the accumulation buffer is equal to or greater than the threshold value. The threshold value may be a value for determining whether the accumulated update value has been accumulated to the magnitude that may affect the weight. For example, the threshold value may be a value corresponding to a least significant effective digit of the weight.

If the weight is a fixed point value, the least significant effective digit of the weight may be a digit corresponding to a least significant bit of the bits representing the weight. For example, if the least significant bit of the weight represents a $2^{-4}$ digit, the least significant effective digit of the weight may be a $2^{-4}$ digit, and the threshold value may be $2^{-4}$ that corresponds to the least significant effective digit of $2^-$. In an example, a $2^{-4}$ digit may correspond to a smallest possible value greater than zero of an 8-bit fixed point data including a 4-bit integer part and a 4-bit fractional part.

If the weight is a floating point value, the least significant effective digit of the weight may be a digit corresponding to the least significant bit of the bits representing an exponent part of the weight. However, if the weight is the floating point value, a bias may be considered to determine the least significant effective digit. For example, even if the least significant bit of the bits representing the exponent part of the weight represents a $2^0$ digit, if the bias is 8, the least significant effective digit of the weight is not a $2^{2^0}=2^1$ digit but a $2^{1-8}=2^{-7}$ digit, and the threshold value may be $2^{-7}$ that corresponds to the least significant effective digit of $2^{-7}$.

However, this is merely an example, and the threshold value may be any appropriate value between the value corresponding to the least significant effective digit of the weight and a value corresponding to a most significant effective digit of the accumulated update value.

If the accumulated update value is equal to or greater than the threshold value, since the accumulated update value has the magnitude that may affect the weight, the neural network apparatus may update the weight by using the accumulated update value.

Specifically, the neural network apparatus may determine a part of the accumulated update value that may be summed to an effective digit of the weight as an effective update value. The effective update value may mean a value actually used to update the weight in the accumulated update value. A range of values that weights may represent is limited by the number of bits allocated to the weights. Therefore, only values corresponding to the effective digit of the weight among values above the least significant effective digit of the weight may be added to the weight.

For example, when the weight is an 8-bit fixed point value including a 1-bit sign bit, a 3-bit integer part, and a 4-bit fractional part, the effective digit of the weight may be $2^2$, $2^1$, $2^0$, $2^{-1}$, $2^{-2}$, $2^{-3}$, and $2^{-4}$ digits. Due to the limit of the range of values that the weight may represent, in order to add a value to the weight, the weight needs to include at least one of values corresponding to any digit among $2^2$, $2^1$, $2^0$, $2^{-1}$, $2^{-2}$, $2^{-3}$, and $2^{-4}$. For example, suppose that a value of 1.265625 (a decimal number) should be summed to the weight. Since the decimal number 1.265625 is equal to $1 \times 2^0 + 1 \times 2^{-2} + 1 \times 2^{-6}$, $1 \times 2^0$ and $1 \times 2^{-2}$ corresponding to the effective digit of the weight may be summed to the weight, whereas $1 \times 2^{-6}$ may not be summed to the weight due to the limit of the range of values that the weight may represent.

Meanwhile, a part that may be summed to the effective digit of the weight may include multiples of a value represented by the least significant digit of the weight. In the preceding example, the value corresponding to the least significant digit of the weight is $2^{-4}$, and the part of the accumulated update value that may be summed to the effective digit of the weight is $2^2$, $2^1$, $2^0$, $2^{-1}$, $2^{-2}$, $2^{-3}$, and $2^{-4}$ that are values corresponding to the $2^2$, $2^1$, $2^0$, $2^{-1}$, $2^{-2}$, $2^{-3}$, and $2^{-4}$ digits. All of $2^2, 2^1, 2^0, 2^{-1}, 2^{-2}, 2^{-3}$, and $2^{-4}$ digits are the multiples of $2^{-4}$ that is the value corresponding to the least significant digit.

Since the threshold value may be the value corresponding to the least significant digit of the weight, the effective update value may include multiples of the threshold value. For example, when the accumulated update value denotes Accumulated update and the threshold value denotes threshold, the effective update value may be expressed by Equation 4 below.

$$\text{effective update} = \left\lfloor \frac{\text{Accumulated update}}{\text{threshold}} \right\rfloor \times \text{threshold} \quad \text{[Equation 4]}$$

In Equation 4, $$\left\lfloor \frac{\text{Accumulated update}}{\text{threshold}} \right\rfloor$$

may be a quotient obtained by dividing Accumulated update by threshold. The effective update value may mean a value obtained by multiplying the quotient obtained by dividing the accumulated update value by the threshold value by the threshold value. Further, the effective update value may be the largest value among multiples of the threshold value that is smaller than the accumulated update value. For example, if Accumulated update is 2.2 (a decimal number) and threshold is 1 (a decimal number), the effective update value may be 2 that is the largest value among 1 and 2 that are multiples of the threshold value of 1 that is smaller than the accumulated update value of 2.2.

The neural network apparatus may add the effective update value to the weight. Since the effective update value is a value actually used to update the weight, the neural network apparatus may update the weight by adding the effective update value to the weight.

The neural network apparatus may also subtract the effective update value from the accumulated update value of the accumulation buffer. Since the effective update value of the accumulated update value of the accumulation buffer is reflected to the weight, the neural network apparatus may subtract the effective update value from the accumulated update value of the accumulation buffer. For example, since the weight is updated, the accumulated update value may be subtracted according to Equation 5 below.

$$\text{Accumulated update} \leftarrow \text{Accumulated update} - \left\lfloor \frac{\text{Accumulated update}}{\text{threshold}} \right\rfloor \times \text{threshold} \quad \text{[Equation 5]}$$

In Equation 5, since $$\left\lfloor \frac{\text{Accumulated update}}{\text{threshold}} \right\rfloor \times \text{threshold}$$

is the effective update value, the accumulated update value of the accumulation buffer may have a value obtained by subtracting the effective update value from a previous accumulated update value.

The neural network apparatus may continuously accumulate the individual update values in the accumulated update value of the accumulation buffer after updating the weight and may repeat the processes described above. The method of processing parameters in the neural network according to the present disclosure may accumulate individual update values much smaller than the value of the weight to a magnitude that may affect the weight and may generally apply the individual update values to the weight, instead of disregarding or discarding the individual update values, thereby minimizing a rounding error in the neural network that uses the low-precision number system. Also, the method of processing parameters in the neural network according to the present disclosure may minimize a precision loss by continuously maintaining a remaining part of the accumulated update value in the accumulation buffer after updating the accumulated update value to the weight.

Meanwhile, the neural network apparatus may determine whether the accumulated update value is equal to or greater than the threshold value at each predetermined update period. The update period may be previously determined by a user and may be determined by the neural network apparatus. Also, the update period may be set to any appropriate period to determine whether the accumulated update value is equal to or greater than the threshold value.

If the individual update values are relatively small, the update period may be determined to be relatively long. If the individual update values are relatively great, the update period may be determined to be relatively short. For example, the update period may be set to be repeated each time the individual update value is calculated, and may be set to be repeated each time the individual update values are calculated ten times but is not limited thereto. For example, the update period may be set to a period corresponding to n-times learning of the neural network.

The neural network apparatus may continue to accumulate the individual update values calculated to a next update period in the accumulation buffer if the accumulated update value is smaller than the threshold value. The neural network apparatus may again determine whether the accumulated update value is equal to or greater than the threshold value in the next update period and update the weight by using the accumulated update value if the accumulated update value is equal to or greater than the threshold value.

Figure 4:
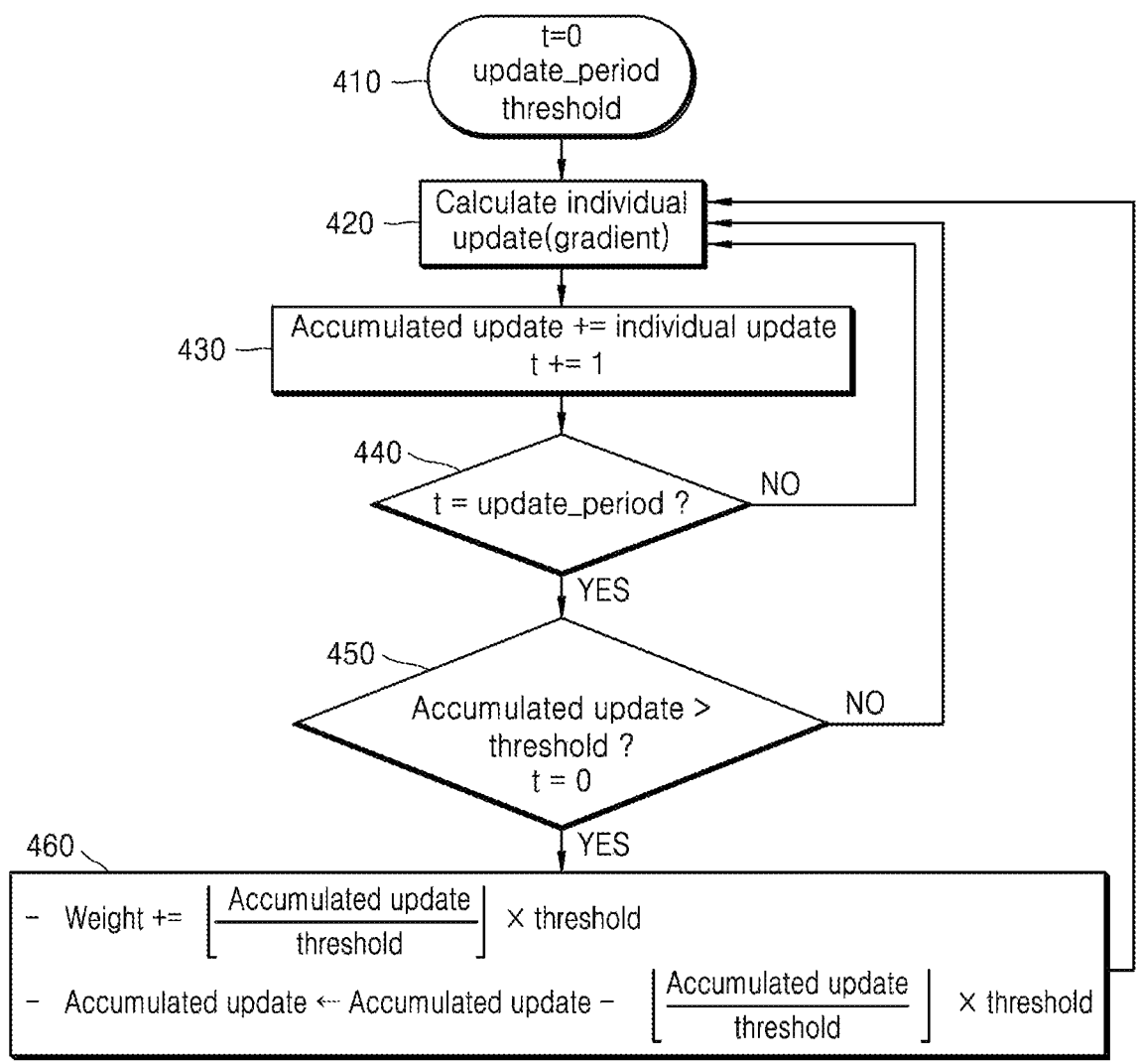
FIG. 4 is a flowchart illustrating another example of a method of processing parameters in a neural network according to one or more embodiments.

An overhead of the neural network may be reduced since the accumulated update value is determined to be equal to or greater than the threshold value in a predetermined period and the parameters used in the neural network apparatus are periodically updated. Referring to FIG. 4, an example of a method of periodically determining whether the accumulated update value is equal to or greater than the threshold value and updating the weight will be described below.

FIG. 4 is a flowchart illustrating another example of a method of processing parameters in a neural network according to some embodiments.

Referring to FIG. 4, in operation 410, time t may be initialized to 0, and an update period update_period and a threshold value threshold may be previously determined. The time t may have a time at which an individual update value is calculated as a basic unit. For example, t=4 may mean a time at which four individual update values are calculated but is not limited thereto. The update period may be 1, 4, or any suitable value equal to or greater than 1. The threshold value may be a value for determining whether the accumulated update value has been accumulated to a magnitude that may affect a weight.

In operation 420, a neural network apparatus may calculate individual update values for weights assigned to connection relationships between nodes included in the neural network. The individual update values may be gradient values for updating the weights by using a gradient descent algorithm.

In operation 430, the neural network apparatus may accumulate the individual update values in an accumulation buffer and add 1 at the time t. In operation 440, the neural network apparatus may determine whether the time t corresponds to the update period. If the time t does not correspond to the update period, the neural network apparatus may return to operation 420 and calculate the individual update values again.

If the time t corresponds to the update period, the neural network apparatus may perform operation 450. In operation 450, the neural network apparatus may determine whether the accumulated update value of the accumulation buffer is equal to or greater than the threshold value. If the accumulated update value is smaller than the threshold value, the neural network apparatus may return to operation 420 and calculate the individual update values again. At this time, the time t may be initialized to 0, and the above-described operations may be repeated for a next update period.

If the accumulated update value is equal to or greater than the threshold value, the neural network apparatus may perform operation 460. In operation 460, the neural network apparatus may update the weight by using the accumulated update value. For example, the neural network apparatus may update the weight by adding an effective update value according to Equation 4 above to the weight. Also, the neural network apparatus may subtract the effective update value from the accumulated update value of the accumulation buffer when the weight is updated.

Figure 5:
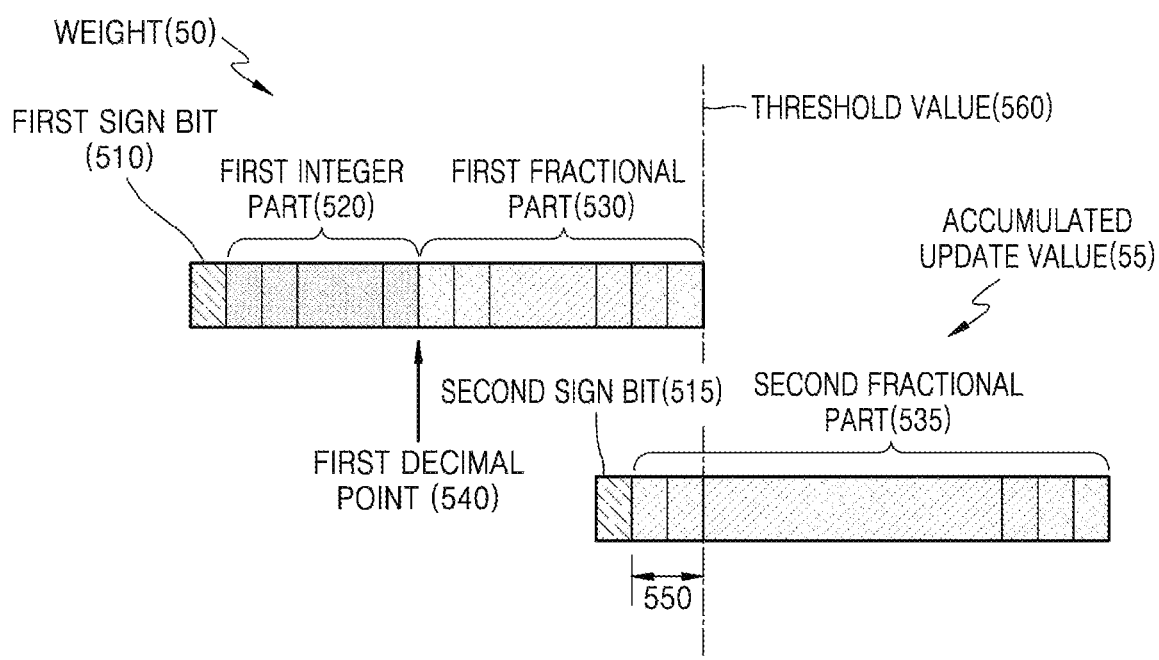
FIG. 5 is a diagram illustrating an example of a neural network that uses fixed point parameters according to one or more embodiments.

FIG. 5 is a diagram illustrating an example of a neural network that uses fixed point parameters according to some embodiments.

Referring to FIG. 5, in the neural network that uses fixed point parameters, a weight 50 may be a fixed point value including a first sign bit 510, a first integer part 520, a first fractional part 530, and a first decimal point 540; and an accumulated update value 55 may be a fixed point value including a second sign bit 515, a second fractional part 535, and a second decimal point. According to some embodiments, the weight 50 may be a dynamic fixed point value at which the first decimal point 540 is movable. Since the first decimal point 540 moves, the number of bits (length) of the first fractional part 530 may be adjusted.

The accumulated update value 55 may not include an integer part. For example, when the first decimal point 540 and the second decimal point are the same, since the accumulated update value 55 may represent only values significantly smaller than the weight 50, the accumulated update value 55 may not include then integer part but may include a fractional part (i.e. the second fractional part 535). Meanwhile, the second decimal point may be the same as the first decimal point 540, but may be different. The second decimal point may be adjusted depending on a situation. Hereinafter, a process of adjusting a position of the second decimal point will be described in detail with reference to FIGS. 8A and 8B.

The weight 50 may be a fixed point value of m bits (m is an arbitrary natural number). The accumulated update value 55 may be a fixed point value of n bits (n is any natural number). m and n may be the same value or may be different values. In a neural network that uses a low-precision number system, each of m and n may have a value of 8 or 16, but is not limited thereto.

The accumulated update value 55 may have a relatively small value compared to the weight 50. Thus, a value corresponding to each of bits representing the weight 50 may be substantially greater than a value corresponding to each of bits representing the accumulated update value 55. However, the value corresponding to any one of the bits representing the weight 50 may be equal to the value corresponding to any one of the bits representing the accumulated update value 55. To update the weight 50, since a part of the accumulated update value 55 needs to be summed to the weight 50, some of lower bits of the weight 50 may overlap with some of upper bits of the accumulated update value 55.

When bits 550 overlapping between the weight 50 and the accumulated update value 55 are k bits (k is an arbitrary natural number), the neural network may obtain the substantially same effect as using fixed point data of (m+n−2−k) bits.

The bits 550 overlapping between the weight 50 and the accumulated update value 55 may be determined with respect to a threshold value 560. The threshold value 560 may be a value for determining whether the accumulated update value 55 has been accumulated to a magnitude that may affect the weight 50. For example, the threshold value 560 may be a value corresponding to a least significant effective digit of the weight 50. The overlapping bits 550 may be bits representing a value equal to or greater than the threshold value 560 among the bits representing the accumulated update value 55. The overlapping bits 550 may overlap with some of the lower bits of the weight 50 and may therefore be summed with the weight 50. Meanwhile, the lower bits of the weight 50 may represent the first fractional part 530.

The neural network apparatus may update the weight 50 by using the accumulated update value 55 if the individual update values are accumulated and the accumulated update value 55 increases to the magnitude that may affect the weight 50. For example, the neural network apparatus may add a value of at least one bit 550 that overlaps the first fractional part 530 of the weight 50 among bits representing the second fractional part 535 of the accumulated update value 55 to the weight 50. The value represented by the at least one bit 550 that overlaps may correspond to an effective update value.

Meanwhile, a padding method may be applied in a process of adding the value represented by the at least one bit 550 that overlaps the first fractional part 530 of the weight 50 among the bits representing the second fractional part 535 of the accumulated update value 55 to the weight 50. Hereinafter, with reference to FIG. 6, a process of adding an effective update value to a weight will be described in detail.

Figure 6:
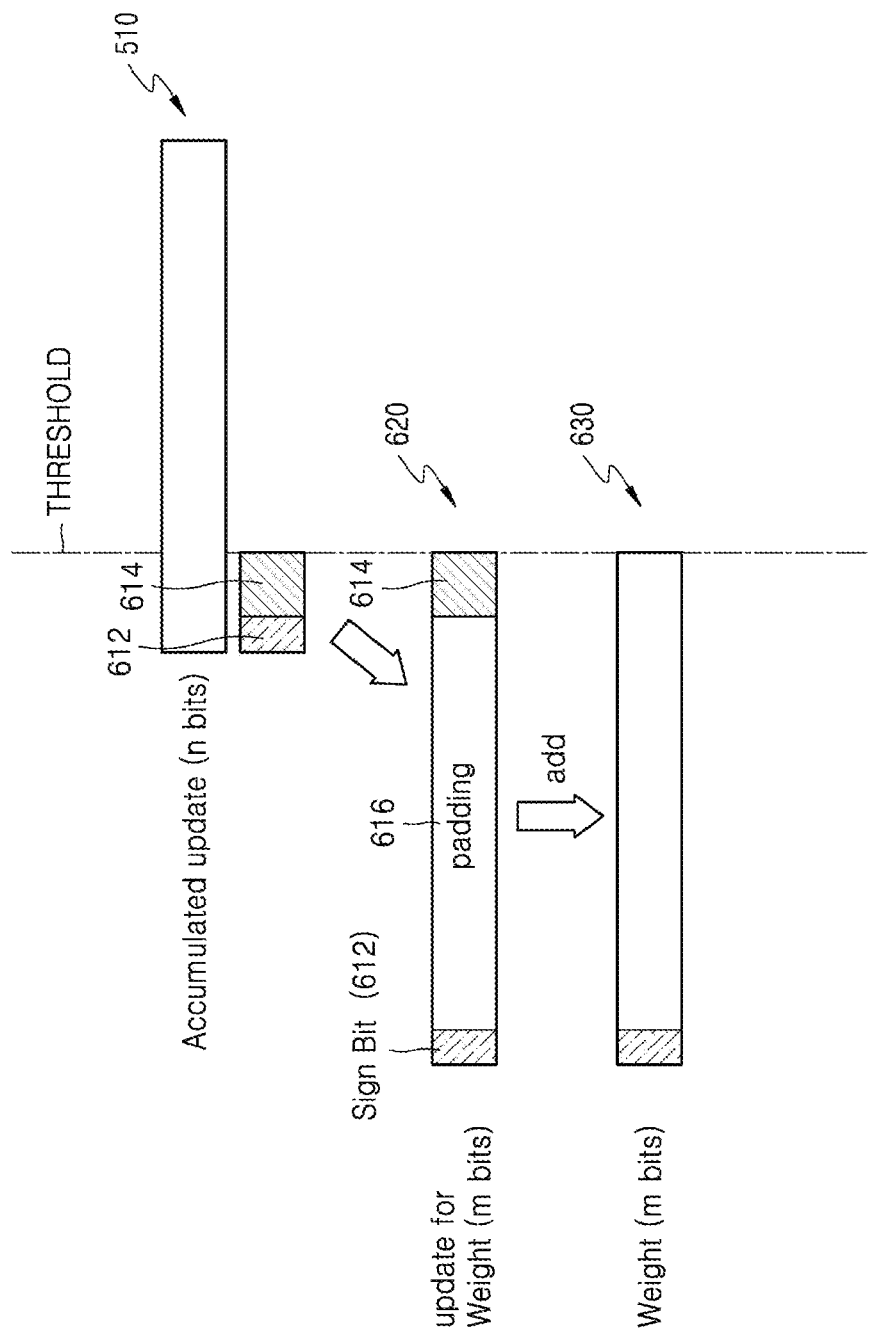
FIG. 6 is a diagram illustrating an example of a process of adding an effective update value to a weight according to one or more embodiments.

FIG. 6 is a diagram illustrating an example of a process of adding an effective update value 614 to a weight 630 according to some embodiments.

Referring to FIG. 6, an accumulated update value 610 is shown. The accumulated update value 610 may be an accumulated value of individual update values. The accumulated update value 610 may also be an n-bit fixed point value. Some of bits representing the accumulated update value 610 may be determined as the effective update value 614. The effective update value 614 may correspond to bits excluding a sign bit 612 among bits located in an upper direction with respect to a threshold value.

Meanwhile, the effective update value 614 may be padded so as to be added to the weight 630 that is an m-bit fixed point value. A padded effective update value 620 may include the sign bit 612, a padding part 616, and the effective update value 614, as shown in FIG. 6. The padding part 616 may be filled with bits representing the same values as the sign bit 612. The padded effective update value 620 may be summed with the weight 630 since the padded effective update value 620 is the m-bit fixed point value that is the same as the weight 630. For example, the padded effective update value 620 may be added to or subtracted from the weight 630 in accordance with the sign bit 612.

Referring back to FIG. 5, the neural network apparatus may add the value represented by the at least one bit 550 that overlaps to the weight 50 and then initialize the value of the at least one bit 550 that overlaps to the second sign bit 515. Since the value represented by the at least one bit 550 that overlaps is added to the weight 50, the accumulated update value 55 must be subtracted by that value. The accumulated update value 55 may be subtracted by the value represented by the at least one bit 550 that overlaps since the value of the at least one bit 550 that overlaps is initialized to the same value as the second sign bit 515.

For example, assume that the accumulated update value 55 which is a positive number is 0100011 (excluding sign bits) and the at least one bit 550 that overlaps the first fractional part 530 of the weight 50 is 01 that are 2 upper bits of the accumulated update value 55. Also, assume that a most significant bit of the accumulated update value 55 represents a $2^{-2}$ digit. Since $0 \times 2^{-2} + 1 \times 2^{-3} = 2^{-3}$, which is the value of 01 represented by the at least one bit 550 that overlaps the first fractional part 530 of the weight 50, is added to the weight 50, $2^{-3}$ must be subtracted from the accumulated update value 55. If $2^{-3}$ is subtracted from the accumulated update value 55, the accumulated update value 55 becomes 0000011. Since the second sign bit 515 of the accumulated update value 55 is 0 (i.e., since the accumulated update value 55 is the positive value), the at least one bit 550 that overlaps is initialized to 0. Unlike the preceding example, when the accumulated update value 55 is a negative value, the value of the at least one bit 550 that overlaps may be initialized to 1 which is the same value as the sign bit.

Figure 7:
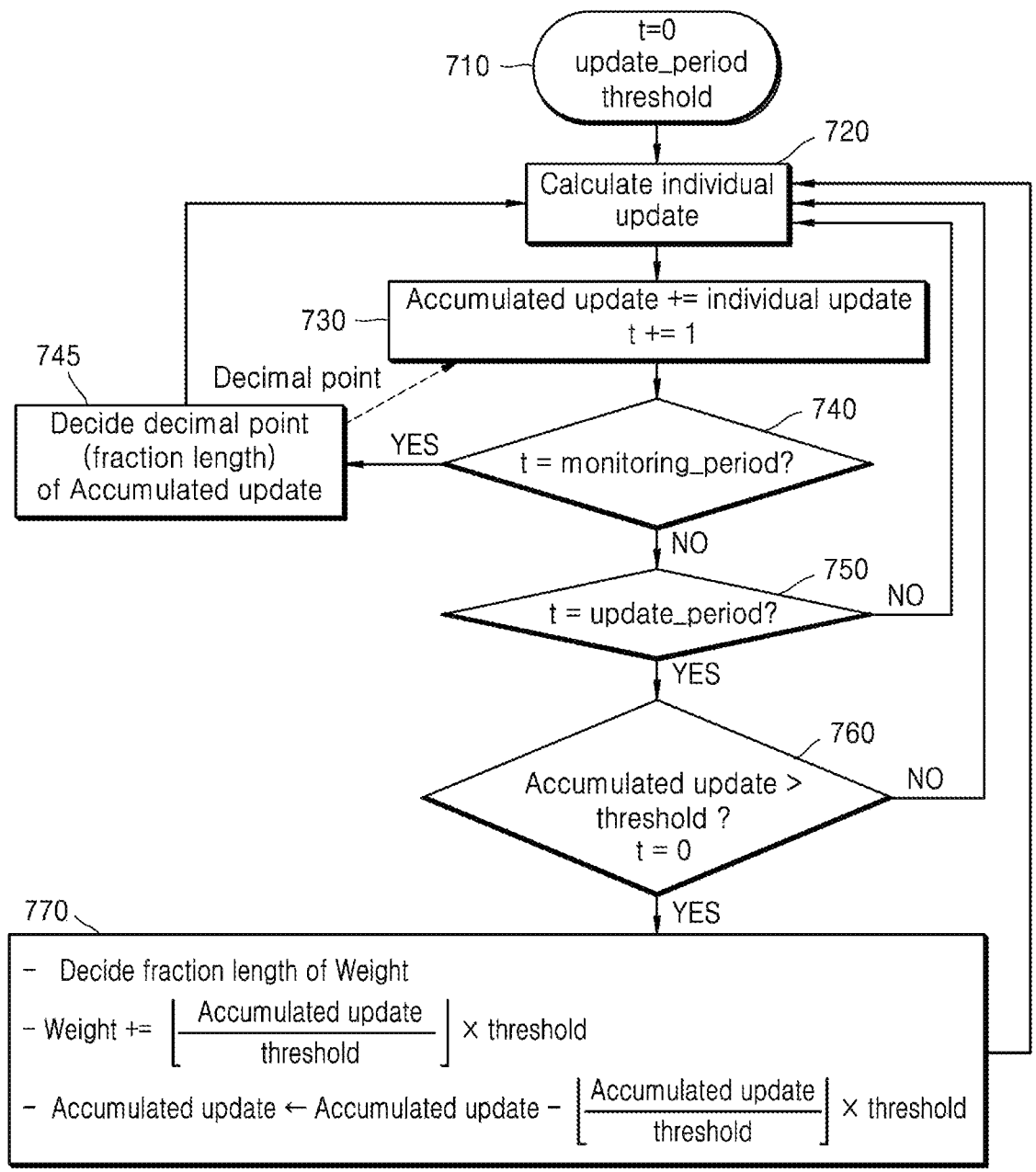
FIG. 7 is a flowchart illustrating an example of a method of processing parameters in a neural network that uses fixed point parameters according to one or more embodiments.

FIG. 7 is a flowchart illustrating an example of a method of processing parameters in a neural network that uses fixed point parameters according to some embodiments. The neural network may be a neural network that uses fixed point parameters as described in FIG. 5.

Referring to FIG. 7, in operation 710, the time t may be initialized to 0, and a monitoring period, an update period, and a threshold value may be previously determined. In operation 720, a neural network apparatus may calculate individual update values for weights assigned to connection relationships between nodes included in the neural network.

In operation 730, the neural network apparatus may accumulate the individual update values in an accumulation buffer and add 1 at the time t. In operation 740, the neural network apparatus may determine whether the time t corresponds to the monitoring period. If the time t corresponds to the monitoring period, the neural network apparatus may perform operation 745.

In operation 745, the neural network apparatus may monitor an accumulated update value or the individual update values and adjust a position of a second decimal point of the accumulated update value based on a result of monitoring. Since the position of the second decimal point of the accumulated update value is adjusted, the number of bits overlapping between the weight and the accumulated update value may be adjusted and the bit number (length) of a fractional part of the accumulated update value may be adjusted.

The neural network apparatus may adjust the position of the second decimal point to minimize a precision loss or reduce an overhead based on a relative magnitude of the individual update values and the weights.

For example, the neural network apparatus may move the position of the second decimal point in a lower bit direction of the accumulated update value if an average value of individual update values is smaller than 1/a times the threshold value (a is an arbitrary natural number).

That the average value of the individual update values is smaller than 1/a times the threshold value means that the individual update values have significantly small values. Since the position of the second decimal point of the accumulated update value moves in the lower bit direction, the accumulated update value may represent a smaller value, and the individual update values may be more accurately reflected to the accumulated update value. The precision loss of the neural network may be minimized since the weight is updated based on the accumulated update value precisely reflecting the individual update values.

Also, when the average value of the individual update values is greater than 1/a times the threshold value, the neural network apparatus may move the position of the second decimal point in an upper bit direction of the accumulated update value.

That the average value of the individual update values is greater than 1/a times the threshold value means that the individual update values have relatively large values. The bits having a magnitude that may be disregarded among the bits representing the accumulated update value may be omitted since the position of the second decimal point of the accumulated update value moves in the upper bit direction. Thus, the overhead of the neural network may be reduced. However, the foregoing description is merely an example, and the neural network may adjust the position of the second decimal point or the bit number (length) of the second fractional part based on various criteria. Hereinafter, a process of adjusting a decimal point position of the accumulated update value will be described in detail with reference to FIGS. 8A and 8B.

Figure 8A:
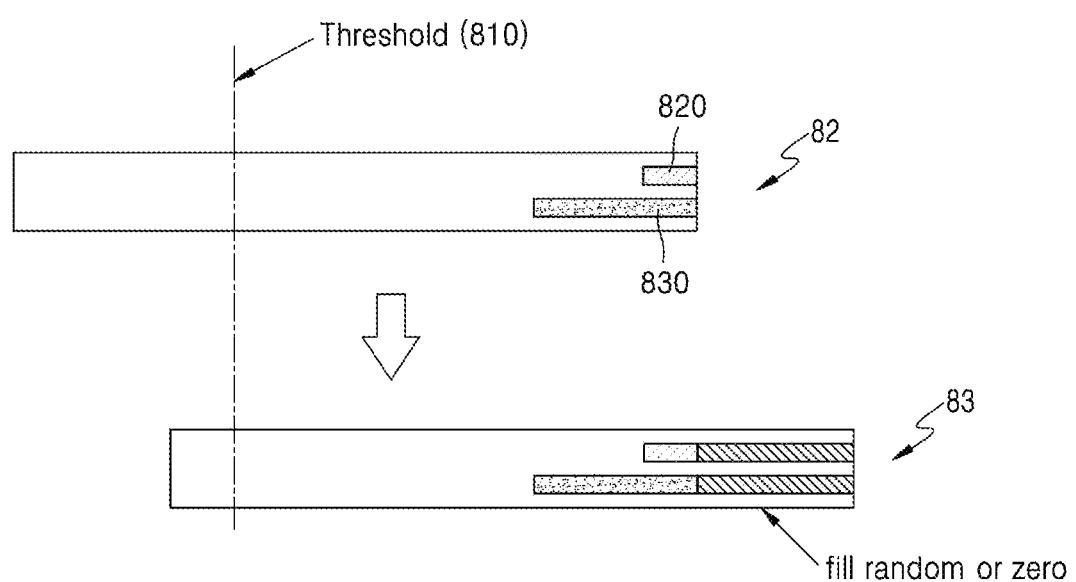
FIG. 8A is a diagram illustrating an example of a process of adjusting a position of a decimal point of an accumulated update value according to one or more embodiments.
Figure 8B:
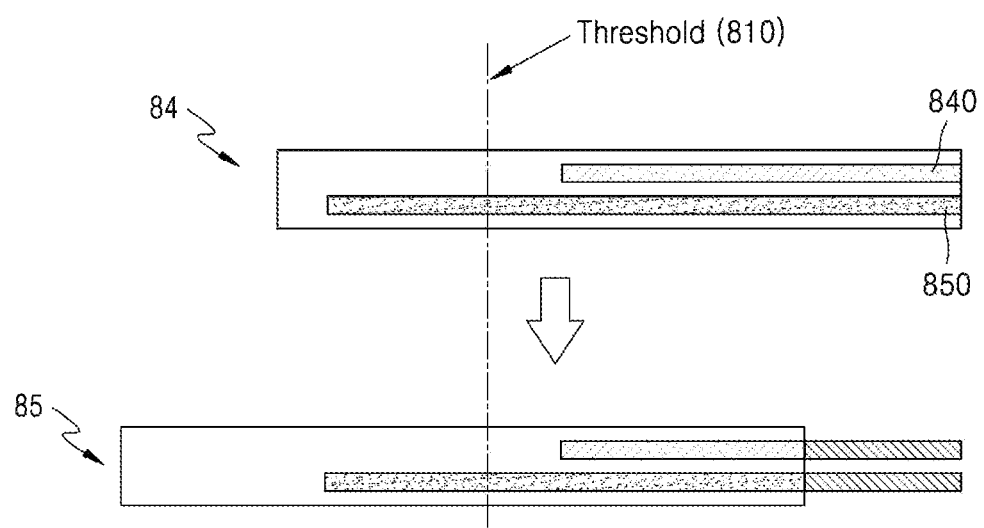
FIG. 8B is a diagram illustrating another example of a process of adjusting a position of a decimal point of an accumulated update value according to one or more embodiments.

FIG. 8A is a diagram illustrating an example of a process of adjusting a position of a decimal point of an accumulated update value according to some embodiments, and FIG. 8B is a diagram illustrating another example of a process of adjusting a position of a decimal point of an accumulated update value according to some embodiments.

Referring to FIG. 8A, a monitored accumulated update value 82 is shown where a currently accumulated value 830 and an individual update value 820 of the monitored accumulated update value 82 may have considerably small magnitudes compared to a threshold value 810. The individual update value 820 may not be accurately reflected to the accumulated update value 82 because there is a limit to a range of a value that the monitored accumulated update value 82 may represent. Accordingly, a neural network may move the position of the decimal point of the accumulated update value 82 in a lower bit direction of the accumulated update value 82.

An accumulated update value 83 having the moved decimal point may more precisely reflect the currently accumulated value 830 and the individual update value 820. Meanwhile, since the decimal point moves, bits corresponding to a value that the accumulated update value 83 may additionally represent may be filled with 0 or an arbitrary number.

Referring to FIG. 8B, a monitored accumulated update value 84 is shown where an individual update value 840 of the monitored accumulated update value 84 has a relatively large value even though the individual update value 840 is smaller than the threshold value 810, and a currently accumulated value 850 has a value greater than the threshold value 810. A neural network apparatus may move the position of the decimal point of the accumulated update value 84 in an upper bit of the accumulated update value 84 in order to omit bits having a magnitude that may be disregarded among bits representing the accumulated update value 84, thereby preventing the accumulated update value 84 from exceeding a value that may be expressed by m bits during an update period.

Returning back to FIG. 7, in operation 745, the neural network apparatus may adjust the position of the second decimal point of the accumulated update value, and then return to operation 720 to calculate the individual update values again.

Meanwhile, if it is determined in operation 740 that the time t does not correspond to the monitoring period, the neural network apparatus may perform operation 750. In operation 750, the neural network apparatus may determine whether the time t corresponds to the update period. If the time t does not correspond to the update period, the neural network apparatus may return to operation 720 and again calculate the individual update values. At this time, the time t may be initialized to 0, and the above-described operations may be repeated during a next update period.

If the time t corresponds to the update period, the neural network apparatus may perform operation 760. In operation 760, the neural network apparatus may determine whether the accumulated update value of the accumulation buffer is equal to or greater than the threshold value. If the accumulated update value is smaller than the threshold value, the neural network apparatus may return to operation 720 to calculate the individual update values again.

If the accumulated update value is equal to or greater than the threshold value, then the neural network apparatus may perform operation 770. In operation 770, the neural network apparatus may update the weight by using the accumulated update value. For example, the neural network apparatus may update the weight by adding the effective update value according to Equation 4 above to the weight. Also, the neural network apparatus may subtract the effective update value from the accumulated update value of the accumulation buffer since the weight is updated. The neural network apparatus may adjust the position of the decimal point of the weight or the bit number (length) of the fractional part depending on a situation.

FIG. 9 is a diagram illustrating an example of a neural network that uses floating point parameters according to some embodiments.

Referring to FIG. 9, in the neural network that uses floating point parameters, a weight 90 may be a floating point value including a first sign bit 910, a first exponent part 920, a first mantissa part 930, and a first bias 940; and an accumulated update value 95 may be a floating point value including a second sign bit 915, a second exponent part 925, a second mantissa part 935, and a second bias 945.

The weight 90 may be an m-bit (where m is a natural number) floating point value. The accumulated update value 95 may be an n-bit (where n is any natural number) floating point value. m and n may be the same value or may be different values. In the neural network that uses a low-precision number system, each of m and n may have a value of 8 or 16, but is not limited thereto.

The accumulated update value 95 may be an accumulated value of individual update values for the weight 90. However, due to a limit of the floating point value with a limited number of bits, the accumulated update value 95 may be a value in which only an effective value of each of individual update values included in an effective number range of the accumulated update value 95 is accumulated.

Also, due to the limit of the floating point value with the limited number of bits, only the effective value of the accumulated update value 95 included in the effective number range of the weight 90 may be added to the weight 90. The effective value of the accumulated update value 95 may mean a part of the accumulated update value 95 that may be added to an effective digit of the weight 90.

Since the weight 90 is updated by the effective value of the accumulated update value 95, the accumulated update value 95 may be subtracted by the updated part. Due to the limit of the floating point value with the limited number of bits, the accumulated update value 95 may be different from a value obtained by subtracting the weight 90 from the updated weight.

Meanwhile, the floating point value may be changed dynamically since a bias is changed. Therefore, even if an exponent part of the floating point value is the same, a relatively small value may be expressed according to the bias. A relative difference between the first bias 940 of the weight 90 and the second bias 945 of the accumulated update value 95 may be appropriately adjusted depending on a situation.

Figure 10:
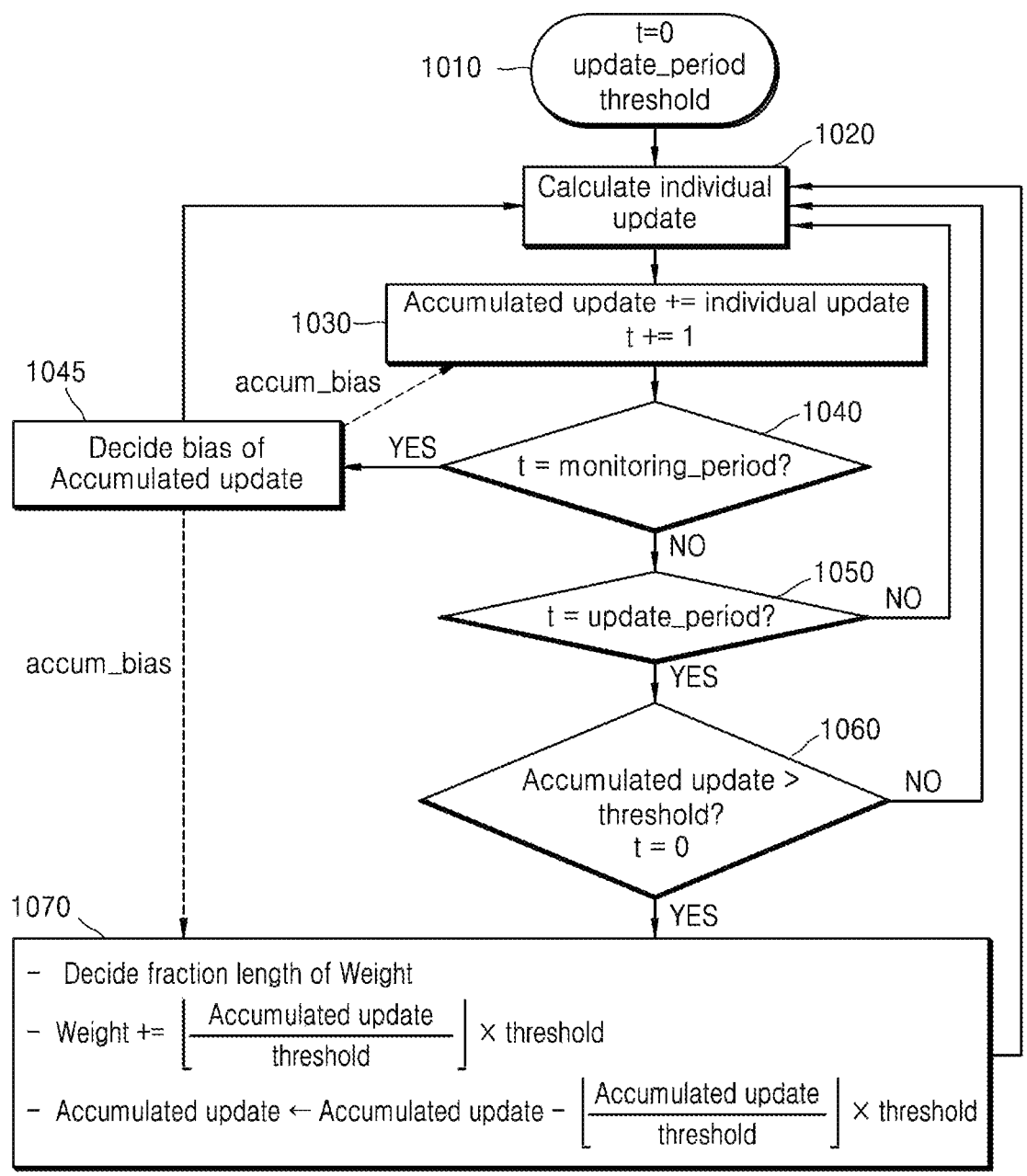
FIG. 10 is a flowchart illustrating an example of a method of processing parameters in a neural network that uses floating point parameters according to one or more embodiments.

FIG. 10 is a flowchart illustrating an example of a method of processing parameters in a neural network that uses floating point parameters according to some embodiments. The neural network may be a neural network that uses floating point parameters as described in FIG. 9.

Referring to FIG. 10, in operation 1010, the time t is initialized to 0, and a monitoring period, an update period, and a threshold value may be previously determined. In operation 1020, a neural network apparatus may calculate individual update values for weights assigned to connection relationships between nodes included in the neural network.

In operation 1030, the neural network apparatus may accumulate the individual update values in an accumulation buffer and add 1 to the time t. In operation 1040, the neural network apparatus may determine whether the time t corresponds to the monitoring period. If the time t corresponds to the monitoring period, the neural network apparatus may perform operation 1045.

In operation 1045, the neural network apparatus may monitor an accumulated update value or individual update values and adjust a second bias of the accumulated update value based on a result of monitoring. A range of a value that the accumulated update value may represent may be adjusted since the second bias of the accumulated update value is adjusted.

The neural network apparatus may adjust the second bias of the accumulated update value to minimize a precision loss or reduce an overhead based on a relative magnitude of the accumulated update value and the threshold value.

For example, the neural network apparatus may increase the second bias if a second exponent of the accumulated update value exceeds the threshold value. That the second exponent of the accumulated update value exceeds the threshold value may mean that the accumulated update value has a relatively large value. Since the second bias of the accumulated update value increases, bits having a magnitude that may be disregarded among bits representing the accumulated update value may be omitted. Thus, the overhead of the neural network may be reduced.

The neural network apparatus may also reduce the second bias if the accumulated update value is smaller than 1/b times the threshold value (b is an arbitrary natural number). That the accumulated update value is smaller than 1/b times the threshold value means that the individual update values have significantly small values. Since the second bias of the accumulated update value is reduced, the accumulated update value may express a smaller value, and the individual update values may be more precisely reflected to the accumulated update value. The precision loss of the neural network may be minimized since the weight is updated by the accumulated update value that precisely reflects the individual update values.

The neural network apparatus may adjust a position of the second bias of the accumulated update value in operation 1045 and then return to operation 1020 to calculate the individual update values again.

Meanwhile, if it is determined in operation 1040 that the time t does not correspond to the monitoring period, the neural network apparatus may perform operation 1050. In operation 1050, the neural network apparatus may determine whether the time t corresponds to the update period. If the time t does not correspond to the update period, the neural network apparatus may return to operation 1020 and calculate the individual update values again. At this time, the time t may be initialized to 0, and the above-described operations may be repeated during a next update period.

If the time t corresponds to the update period, the neural network apparatus may perform operation 1060. In operation 1060, the neural network apparatus may determine whether the accumulated update value of the accumulation buffer is equal to or greater than the threshold value. If the accumulated update value is smaller than the threshold value, the neural network apparatus may return to operation 1020 and calculate the individual update values again.

If the accumulated update value is equal to or greater than the threshold, the neural network apparatus may perform operation 1070. In operation 1070, the neural network apparatus may update the weight by using the accumulated update value. For example, the neural network apparatus may update the weight by adding an effective update value according to Equation 4 above to the weight. Also, the neural network apparatus may subtract the effective update value from the accumulated update value of the accumulation buffer since the weight is updated. The neural network apparatus may adjust a position of a decimal point of the weight or the bit number (length) of a fractional part depending on a situation.

Meanwhile, the method of processing parameters in the neural network shown in FIGS. 2, 4, and 7 may be recorded on a computer-readable recording medium having recorded thereon one or more programs including instructions for performing the method. Examples of the computer-readable recording medium may include magnetic media such as a hard disk, a floppy disk, and a magnetic tape, optical media such as CD-ROM and digital video disc (DVD), magneto-optical media such as a floptical disk, and a hardware apparatus, such as the ROM, the RAM, and the flash memory, specifically configured to store and execute program instructions. Examples of the program instructions may include not only machine language codes generated by a compiler but also high-level language codes executable by a computer by using an interpreter or the like.

Figure 11:
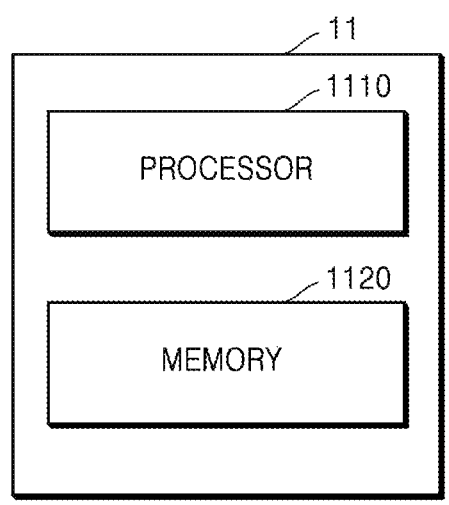
FIG. 11 is a block diagram showing a configuration of a neural network apparatus according to one or more embodiments.

FIG. 11 is a block diagram showing a configuration of a neural network apparatus 11 according to some embodiments.

Referring to FIG. 11, the neural network apparatus 11 may include processor 1110 and memory 1120. Only components related to the present embodiment are shown in the neural network apparatus 11 shown in FIG. 11. Therefore, it is understood after an understanding of the disclosure of this application that the neural network apparatus 11 may further include components other than the components shown in FIG. 11. For example, the neural network apparatus 11 may further include a sensor module and a communication module such as demonstrated in FIG. 12.

Meanwhile, the neural network apparatus 11 may correspond to the neural network apparatus of FIGS. 2 through 10. The neural network apparatus 11 may also time-serially process the method shown in FIGS. 2, 4, 7 and 10. Therefore, it will be understood that the method described with reference to FIGS. 2, 4, 7 and 10 may be performed by the neural network apparatus 11 of FIG. 11 even if omitted below.

The neural network apparatus 11 may be included in at least one of a home appliance, a mobile computing device, and a server, or may be connected to at least one of the home appliance, the mobile computing device, and the server by wired or wirelessly. The neural network apparatus 11 may also be implemented by a combination of a device and a server. A device that receives a user input and a server that trains a neural network may exist separately, or may be included in the same device, or in separate servers, and thus inference may be performed through communication between the device and the server when that server thereby implements the trained neural network. Inference may be performed in a single device, and is not limited to the above example.

The processor 1110 is representative of one or more processors. For example, the processor 1110 may be implemented as an array of logic gates, and may be implemented as a combination of a general purpose microprocessor and a memory in which a program executable in the microprocessor is stored. For example, the processor 1110 may be a central processing unit (CPU), a graphics processing unit (GPU), a hardware accelerator, or the like.

The processor 1110 may generally operate in order to control the neural network apparatus 11. For example, the processor 1110 may generally control the neural network apparatus 11 by executing programs stored in the memory 1120 included in the neural network apparatus 11. The processor 1110 may also perform functions of the neural network apparatus 11 in parallel by executing the programs stored in the memory 1120.

The processor 1110 may perform a function of each of nodes included in layers of the neural network. For example, the processor 1110 may perform a neural network operation or a matrix operation by using activation values and weights. The processor 1110 may also perform a function of the neural network apparatus 11 described in FIGS. 2-10.

Specifically, the processor 1110 may calculate individual update values for weights assigned to connection relationships between the nodes included in the neural network. The weight may be a floating point value or a fixed point value.

Also, the processor 1110 may accumulate the individual update values in an accumulation buffer. The accumulation buffer may be dedicated hardware for accumulating the individual update values and may be a part of the memory 1120 allocated to accumulate the individual update values. The individual update values may be accumulated in the accumulation buffer to be an accumulated update value. The accumulation buffer may store the accumulated update value.

The processor 1110 may determine whether the accumulated update value of the accumulation buffer is equal to or greater than a threshold value. The threshold value may be a value for determining whether the accumulated update value has been accumulated to a magnitude that may affect the weight. For example, the threshold value may be a value corresponding to a least significant effective digit of the weight.

The least one processor 1110 may update the weights by using the accumulated update value if the accumulated update value is equal to or greater than the threshold value. If the accumulated update value is equal to or greater than the threshold value, since the accumulated update value has the magnitude that may affect the weight, the processor 1110 may update the weight by using the accumulated update value.

The processor 1110 may determine a part of the accumulated update value that may be added to an effective digit of the weight as an effective update value. The processor 1110 may add the effective update value to the weight and subtract the effective update value from the accumulated update value of the accumulation buffer.

The processor 1110 may accumulate individual update values much smaller than a value of the weight to a magnitude that may affect the weight and may generally apply the individual update values to the weight, instead of disregarding or discarding the individual update values, thereby minimizing a rounding error in the neural network that uses a low-precision number system.

Meanwhile, the processor 1110 may determine whether the accumulated update value is equal to or greater than the threshold value at each predetermined update period. The update period may be previously determined by a user and may be determined by the processor 1110. The processor 1110 may continue to accumulate the individual update values calculated to a next update period in the accumulation buffer if the accumulated update value is smaller than the threshold value.

The processor 1110 may again determine whether the accumulated update value is equal to or greater than the threshold value in the next update period and update the weight by using the accumulated update value if the accumulated update value is equal to or greater than the threshold value.

It is determined whether the accumulated update value is equal to or greater than the threshold value according to a certain period and a parameter used in the neural network apparatus 11 is periodically updated, and thus an overhead of the neural network may be reduced.

When the weight is a fixed point value including a first sign bit, a first integer part, a first fractional part and a first decimal point, and the accumulated update value is a fixed point value including a second sign bit, a second fractional part and a second decimal point, the processor 1110 may add to the weight a value represented by at least one bit that overlaps the first fractional part of the weight among bits representing the second fractional part of the accumulated update value, and initialize the value represented by the at least one bit that overlaps to the same value as the second sign bit.

Also, the processor 1110 may monitor the accumulated update value and the individual update values and adjust a position of the second decimal point of the accumulated update value based on a result of monitoring. For example, the processor 1110 may move the position of the second decimal point in a lower bit direction of the accumulated update value if an average value of the individual update values is smaller than 1/a times the threshold value, and may move the position of the second decimal point in an upper bit of the accumulated update value if the average value is greater than 1/a times the threshold value.

Meanwhile, if the weight is a floating point value including a first sign bit, a first exponent part, a first mantissa part, and a first bias, and the accumulated update value is a floating point value including a second sign bit, a second exponent part, and a second bias, the processor 1110 may add to the weight an effective value of the accumulated update value included in an effective number range of weight.

Also, the processor 1110 may monitor the accumulated update value and adjust the second bias of the accumulated update value based on a result of monitoring. For example, the processor 1110 may increase the second bias if the second exponent of the accumulated update value exceeds the threshold value, and may reduce the second bias if the accumulated update value is smaller than 1/b times the threshold value.

The memory 1120 is hardware storing various pieces of data processed in the neural network apparatus 11. For example, the memory 1120 may store data processed and data to be processed by the neural network apparatus 11. The memory 1120 may also store applications, drivers, etc., to be driven by the neural network apparatus 11. The memory 1120 may be a random access memory (RAM), a read-only memory (ROM), an electrically erasable programmable read-only memory (EEPROM), a dynamic random access memory (DRAM) ROM, Blu-ray or other optical disk storage, hard disk drive (HDD), solid state drive (SSD), or flash memory.

The memory 1120 may further include a built-in memory shared by the processor 1110 included in the neural network apparatus 11 or a plurality of built-in memories supporting the processor 1110.

Figure 12:
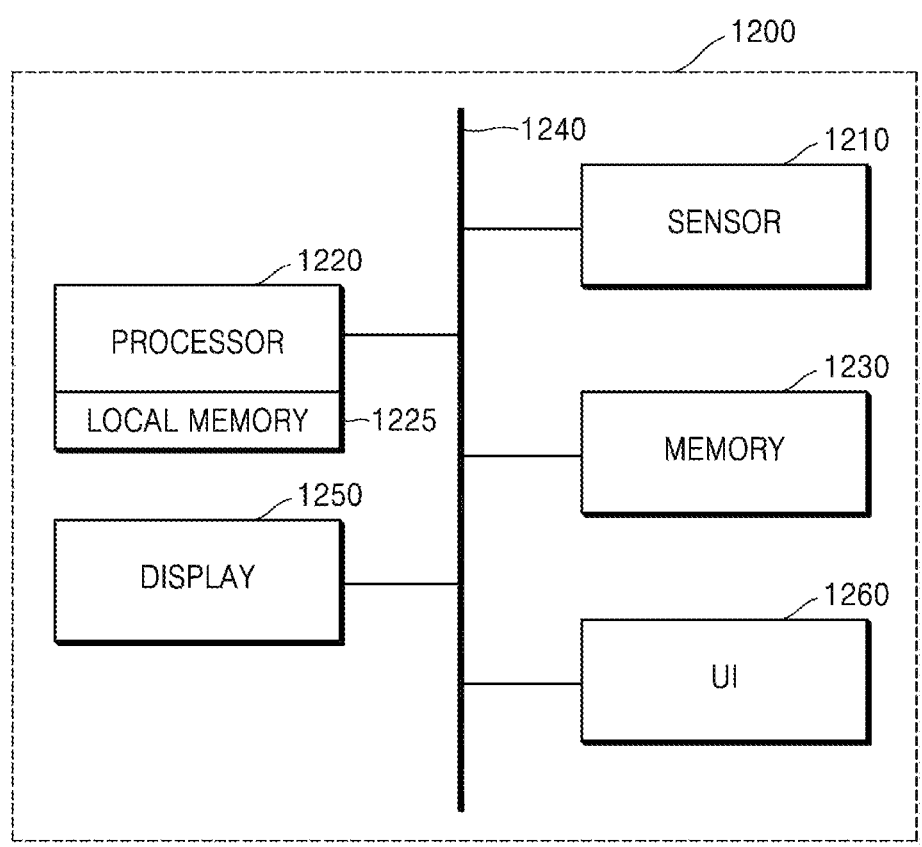
FIG. 12 is a diagram illustrating an example of an electronic system or device configured to implement a neural network inference operation.

FIG. 12 is a diagram illustrating an example of an electronic system or device configured to implement a neural network inference operation.

Referring to FIG. 12, an electronic system or device 1200 includes a sensor 1210, a processor 1220, a local memory 1225, a memory 1230, a display 1250, and a user interface (UI) 1260. The sensor 1210, the processor, 1220, the memory 1230, the display 1250, and the UI 1260 communicate with each other via a bus 1240. The electronic system or device 1200 may correspond to any one or more or all of the above neural network (NN) processing apparatuses and implement any one or more or all of the above NN processing processes or methods. As a non-limiting example, the processor 1220 may correspond to the processor 1110 of FIG. 11, and/or the memory 1230 may correspond to the memory 1120 of FIG. 11. The local memory 1225 may correspond to any of the above described temporary or local buffers/memories. In an example, the local buffers/memories may be memories of the processor 1220 or buffers/memories directly connected to the processor 1220, e.g., configured for rapidly transferring data to/from the processor 1220 and the local memory 1225, noting that alternatives are also available. The local memory 1225 may further be allocated to temporarily store activations of a particular layer of the NN, or all layers of the NN, the ultimate output results of which may be stored in the memory 1230 and/or respectively used for inputs to a next layer. In an example, except for purposes of an input to a next layer, the activations of each layer may discarded and only final layer(s) output results of the NN stored to the memory 1230 or used for another process, such as in cooperation with an unlocking and corresponding display operation of a mobile phone as the electronic system or device 1200. As also noted, the processor 1220 may represent one or more processors that are configured as any or any combination of the above NN processing apparatuses, recognition apparatuses, rejection apparatuses, and/or verification apparatuses, as non-limiting examples.

The sensor 1210 includes, for example, a microphone and/or an image sensor or camera to sense video data and audio data to recognize, reject, or verify an object, for example. The sensor 1210 senses an image using a well-known scheme, for example, a scheme of converting an optical image to an electronic signal. An output of the sensor 1210 is transferred to the processor 1220 or the memory 1230, and output of the sensor 1210 may also be transferred directly to, or operate as, an input layer of any of the NNs discussed herein.

The processor 1220 may be configured to perform one or more or all processes described with reference to FIGS. 1 through 11. For example, to perform an object detection, recognition, rejection, and/or verification operations, the processor 1220 may detect, recognize, reject, and/or verify one or more objects in the input data using the neural network trained throughout the operations described above with respect to FIGS. 1 through 11, for example. The result of any of the recognition, rejection, or verification operations may be output through the display 1250. In addition, user adjustments or selective operations of the electronic device 1200 be provided by UI 1260, which may include a touch screen or other input device/system. In an example, the processor 1220 may be a graphics processor unit (GPU), a central processing unit (CPU), a reconfigurable processor, an application processor (AP), a neural processing unit (NPU), tensor processing unit (TPU), a HW accelerator, or otherwise an neuromorphic chip, or have any other type of multi- or single-processor configuration. In an example, the processor 1220 is further representative of multiple processors, e.g., with at least one processor being configured as such specialized neural network implementing processors and another processor configured to perform the other operations of the electronic device. Such specialized neural network implementing processors may also be configured in a secure area, with the corresponding processor 1220 and local memory 1225 being securely separated from other operations of other corresponding processors 1220 and the memory 1230, for example.

In addition to operations of one or more of the NN processing apparatuses and/or operations described in FIGS. 1 through 11, as noted above, the memory 1230 may further store instructions which, when executed by processor 1220, cause the processor 1220 to perform additional operations, functions, and controls of the electronic system or device 1200, such as a user interface of the electronic system based on inference operations performed by the processor 1220 using the trained neural network. The electronic system or device 1200 may be connected to an external device, for example, a personal computer (PC) or a network, via an input/output device of the electronic system, to exchange data with the external device. The electronic system or device 1200 may be various electronic devices, as only non-limiting examples, a mobile device, for example, a mobile telephone, a smartphone, a personal digital assistant (PDA), a tablet computer or a laptop computer, a computing device, for example, a PC, a tablet computer or a netbook computer, an electronic product, for example, a television (TV), a smart TV, or a security device for gate control.

The neural network apparatus 11, the processor 1110, the memory 1120, electronic system or device 1200, bus 1240, processor 1220, local memory 1225, sensor 1210, memory 1230, display 1250, and user interface 1260 in FIGS. 1 through 12 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 through 12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

A neural network apparatus may perform many operations on complex input data. A technique of efficiently processing neural network operations is desired such that the neural network apparatus may analyze high-definition input data and extract information in real time. Thus, methods and apparatuses that reduce the computational amount for processing complex data input to the neural network while minimizing precision loss have been disclosed herein.

It should be understood that the embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood after an understanding of the disclosure of this application that various changes in form and details may be made therein without departing from the spirit and scope as defined by the following claims.

What is claimed is:

1. A processor-implemented neural network method, the method comprising:
   calculating individual update values for a weight assigned to a connection relationship between nodes included in a neural network;
   generating an accumulated update value by accumulating the individual update values in an accumulation buffer; and
   training the neural network by updating the weight using the accumulated update value in response to the accumulated update value being equal to or greater than a threshold value,
   wherein the threshold value is a value corresponding to a least significant effective bit of the weight.

2. The method of claim 1, wherein
   the updating of the weight comprises:
   determining an effective update value based on the accumulated update value;
   updating the weight by adding the effective update value to the weight; and
   updating the accumulation buffer by subtracting the effective update value from the accumulated update value in the accumulation buffer, to generate a new accumulated update value.

3. The method of claim 2, wherein the effective update value is a portion of the accumulated update value.

4. The method of claim 2, wherein the effective update value is a multiple of the least significant effective bit of the weight.

5. The method of claim 1, further comprising: determining whether the accumulated update value is equal to or greater than the threshold value at a predetermined update period.

6. The method of claim 5, further comprising:
   accumulating the individual update values in the accumulation buffer until a next update period in response to a result of the determining being that the accumulated update value is smaller than the threshold value.

7. The method of claim 1, wherein:
   the weight is a floating point value comprising a first sign bit, first exponent part, a first mantissa part, and a first bias;
   the accumulated update value is a floating point value comprising a second sign bit, a second exponent part, a second mantissa part, and a second bias; and
   the updating comprises adding an effective value of the accumulated update value included in an effective number range of the weight to the weight.

8. The method of claim 7, further comprising: adjusting the second bias of the accumulated update value.

9. The method of claim 7, wherein the adjusting comprises:
   increasing the second bias in response to the second exponent of the accumulated update value being greater than the threshold value; and
   decreasing the second bias in response to the accumulated update value being smaller than a second threshold value.

10. The method of claim 9, wherein:
    the second threshold value is 1/b times the threshold value; and
    b is a natural number.

11. A processor-implemented neural network method, the method comprising:
    calculating individual update values for a weight assigned to a connection relationship between nodes included in a neural network;
    generating an accumulated update value by accumulating the individual update values in an accumulation buffer; and
    training the neural network by updating the weight using the accumulated update value in response to the accumulated update value being equal to or greater than a threshold value,
    wherein:
    the weight is a fixed point value comprising a first sign bit, a first integer part, and a first fractional part;
    the accumulated update value is a fixed point value comprising a second sign bit and a second fractional part; and
    the updating comprises adding, to the weight, a value of at least one bit that overlaps the first fractional part of the weight among bits representing the second fractional part of the accumulated update value.

12. The method of claim 11, wherein the updating comprises initializing the value of the at least one bit of the accumulated update value to a same value as the second sign bit.

13. The method of claim 11, further comprising: adjusting a position of a decimal point of the accumulated update value.

14. The method of claim 13, wherein the adjusting comprises:
    moving the position of the decimal point of the accumulated update value in a lower bit direction of the accumulated update value in response to an average value of the individual update values being smaller than a second threshold value; and
    moving the position of the decimal point of the accumulated update value in an upper bit direction of the accumulated update value in response to the average value of the individual update values being greater than the second threshold value.

15. The method of claim 14, wherein:
    the second threshold value is 1/a times the threshold value; and
    a is a natural number.

16. The method of claim 11, wherein the weight is a dynamic fixed point value of which a bit number of the first fractional part is adjusted.

17. A non-transitory computer-readable storage medium storing instructions that, when executed by a processor, cause the processor to perform the method of claim 1.

18. A neural network apparatus, the apparatus comprising:
    one or more processors configured to:
    calculate individual update values for a weight assigned to a connection relationship between nodes included in a neural network,
    generate an accumulated update value by accumulating the individual update values in an accumulation buffer, and
    train the neural network by updating the weight using the accumulated update value in response to the accumulated update value being equal to or greater than a threshold value,
    wherein the threshold value is a value corresponding to a least significant effective bit of the weight.

19. The apparatus of claim 18,
wherein, for the updating of the weight, the one or more processors are configured to:
determine an effective update value based on the accumulated update value;
update the weight by adding the effective update value to the weight; and
update the accumulation buffer by subtracting the effective update value from the accumulated update value in the accumulation buffer, to generate a new accumulated update value.

20. The method of claim 19, wherein the effective update value is a portion of the accumulated update value.

21. The method of claim 19, wherein the effective update value is a multiple of the least significant effective bit of the weight.

22. The apparatus of claim 18, wherein the one or more processors are further configured to determine whether the accumulated update value is equal to or greater than the threshold value at a predetermined update period.

23. The apparatus of claim 22, wherein, for the generation of the accumulated update value, the one or more processors are configured to accumulate the individual update values in the accumulation buffer until a next update period in response to a result of the determining being that the accumulated update value is smaller than the threshold value.

24. The apparatus of claim 18,
wherein the weight is a fixed point value comprising a first sign bit, a first integer part, and a first fractional part,
wherein the accumulated update value is a fixed point value comprising a second sign bit and a second fractional part,
wherein, for the updating of the weight, the one or more processors are configured to add, to the weight, a value of at least one bit that overlaps the first fractional part of the weight among bits representing the second fractional part of the accumulated update value.

25. The apparatus of claim 24, wherein the one or more processors are further configured to initialize the value of the at least one bit of the accumulated update value that overlaps the first fractional part to a same value as the second sign bit.

26. The apparatus of claim 24, wherein the one or more processors are further configured to adjust a position of a decimal point of the accumulated update value.

27. The apparatus of claim 26, wherein, for the adjusting, the one or more processors are configured to:
move the position of the decimal point of the accumulated update value in a lower bit direction of the accumulated update value in response to an average value of the individual update values being smaller than a second threshold value; and
move the position of the decimal point of the accumulated update value in an upper bit direction of the accumulated update value in response to the average value of the individual update values being greater than the second threshold value.

28. The apparatus of claim 27, wherein:
the second threshold value is 1/a times the threshold value; and
a is a natural number.

29. The apparatus of claim 18, wherein:
the weight is a floating point value comprising a first sign bit, a first exponent part, a first mantissa part, and a first bias;
the accumulated update value is a floating point value comprising a second sign bit, a second exponent part, a second mantissa part, and a second bias; and
wherein, for the updating of the weight, the one or more processors are configured to add an effective value of the accumulated update value included in an effective number range of the weight to the weight.

30. The apparatus of claim 18, further comprising:
a memory storing one or more instructions, wherein the execution of the instructions by the one or more processors configures the one or more processors to perform the calculation of the individual update values, the generation of the accumulated update value, and the training of the neural network.

* * * * *